United States Patent
Kato

(10) Patent No.: US 8,249,790 B2
(45) Date of Patent: Aug. 21, 2012

(54) VEHICLE BEHAVIOR CONTROL DEVICE

(75) Inventor: Kazuhiro Kato, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 856 days.

(21) Appl. No.: 12/155,394

(22) Filed: Jun. 3, 2008

(65) Prior Publication Data

US 2008/0300765 A1    Dec. 4, 2008

(30) Foreign Application Priority Data

Jun. 4, 2007  (JP) ................................. 2007-147991
May 15, 2008  (JP) ................................. 2008-128103

(51) Int. Cl.
*B60B 39/00* (2006.01)
*B60T 7/12* (2006.01)

(52) U.S. Cl. ............... 701/71; 701/70; 701/72; 701/73; 701/74; 701/75; 701/76; 701/77; 701/78; 701/79

(58) Field of Classification Search .................. None
See application file for complete search history.

(56) References Cited

U.S. PATENT DOCUMENTS

| | | | | |
|---|---|---|---|---|
| 3,750,583 A * | 8/1973 | White et al. | ................... | 102/221 |
| 5,228,757 A * | 7/1993 | Ito et al. | ........................ | 303/146 |
| 5,267,783 A * | 12/1993 | Inoue et al. | ................... | 303/146 |
| 5,292,188 A * | 3/1994 | Okazaki | ........................ | 303/147 |
| 5,402,344 A * | 3/1995 | Reister et al. | ................... | 701/84 |
| 5,627,756 A * | 5/1997 | Fukada et al. | ................... | 701/70 |
| 5,640,324 A | 6/1997 | Inagaki | | |
| 5,717,591 A * | 2/1998 | Okada et al. | ..................... | 701/82 |
| 5,813,732 A * | 9/1998 | Monzaki et al. | .............. | 303/146 |
| 5,839,798 A | 11/1998 | Monzaki et al. | | |
| 5,839,799 A * | 11/1998 | Fukada | ......................... | 303/146 |
| 6,290,311 B1 * | 9/2001 | Watanabe et al. | ............. | 303/146 |
| 7,274,982 B1 * | 9/2007 | Ohkubo et al. | ................. | 701/41 |

* cited by examiner

*Primary Examiner* — Khoi Tran
*Assistant Examiner* — Bhavesh V Amin
(74) *Attorney, Agent, or Firm* — Posz Law Group, PLC

(57) ABSTRACT

It is predicted whether a spin amount is tending to diverge and a vehicle is tending to become unstable, or the spin amount is tending to converge and the vehicle is tending to become stable. When the convergent tendency is predicted, a correction to reduce the spin amount is performed. As a result, the performance of a braking force control can be made difficult when the spin amount is tending to converge. Thus, it is possible to prevent an anti-spin control from being performed when there is actually no need to perform the anti-spin control, such as when the vehicle posture is correcting.

18 Claims, 15 Drawing Sheets

VEHICLE BEHAVIOR CONTROL DEVICE

CROSS REFERENCE TO RELATED APPLICATION

This application is based on and incorporates herein by reference Japanese patent applications No. 2007-147991 filed on Jun. 4, 2007 and No. 2008-128103 filed on May 15, 2008.

FIELD OF THE INVENTION

The present invention relates to a vehicle control device that controls behavior of a vehicle by performing anti-side slip control.

BACKGROUND OF THE INVENTION

Various vehicle behavior control devices are known that control behavior of a vehicle by performing anti-side slip control, such as anti-spin (anti-oversteer) control and understeer suppression control, in the vehicle.

For example, Japanese Patent Application Publication No. JP-A-H9-104329 discloses a technology in which a spin amount is obtained. The spin amount is obtained as the sum of a value obtained by multiplying a side slip acceleration Vyd, which is a side slip index of a vehicle body, by a determined coefficient and a value obtained by multiplying a slip angle $\beta$ of the vehicle body by a determined coefficient. Alternatively, the spin amount is obtained as a linear sum of the slip angle $\beta$ of the vehicle body and a slip angle velocity $\beta'(=d\beta/dt)$, which is a derivative value of the slip angle $\beta$. When the obtained spin amount exceeds a threshold value, anti-spin control is performed.

Japanese Patent Application Publication No. JP-A-H7-215190 discloses a technology in which the slip angle velocity $\beta'$ of the vehicle body and the slip angle $\beta$ of the vehicle body are expressed by a coordinate in a $\beta$-$\beta'$ two dimensional state diagram. When the coordinate of the obtained slip angle velocity $\beta'$ and slip angle $\beta$ exceeds the boundary between a stable region and an unstable region of the $\beta$-$\beta'$ two dimensional state diagram and enters the unstable region, anti-spin control is started.

As described above, the method described in JP-A-H9-104329 compares the spin amount with the threshold value, and the method described in JP-A-H7-215190 compares the coordinate of the slip angle velocity $\beta'$ and the slip angle $\beta$ with the boundary in the $\beta$-$\beta'$ two dimensional state diagram. If the spin amount or the coordinate exceeds the boundary determined in advance, the anti-spin control is performed. However, there are some cases when spin behavior does not actually occur, for example, when the posture of the vehicle is corrected after changing lane or after performing a steering operation to avoid an obstacle in the case of an emergency. This phenomenon will be described with reference to FIG. 18.

In the case of changing lane or the like, after the driver turns a steering wheel in a direction he/she wants to go, the driver turns back the steering wheel to direct the vehicle in the traveling direction. Accordingly, as shown in FIG. 18, a steering angle, a yaw rate, and a lateral acceleration (lateral G) are generated in accordance with the turning operation and the turning back operation of the steering wheel. In addition, when correcting the posture of the vehicle after turning back the steering wheel, a yaw rate and a lateral G are generated in a direction that is opposite to the direction when the steering wheel is turned back. As a result, the spin amount described in JP-A-H9-104329 or the coordinate described in JP-A-H7-215190 exceeds the threshold value, and thus the anti-spin control is performed.

The above-described coordinate is likely to enter the unstable region particularly when the posture is corrected in a region where the absolute value of the slip angle $\beta$ is small but the absolute value of the slip angle velocity $\beta'$ is large, i.e., a region in the vicinity of the boundary near the $\beta'$ axis in the $\beta$-$\beta'$ two dimensional diagram. In such a case, the anti-spin control is performed.

If the anti-spin control is performed even in such a case, it may give the driver a feeling of erroneous activation or an unpleasant sensation. Further, it may cause an uncomfortable sensation such as kickback to the steering wheel.

In the method described in JP-A-H7-215190, various data about a trajectory showing the changing states of the slip angle velocity $\beta'$ and the slip angle $\beta$ are collected, and the stable region and the unstable region are classified based on the collected data. However, it is difficult to determine whether or not the spin behavior during the vehicle posture correction is occurring.

SUMMARY OF THE INVENTION

In light of the above-described problems, it is an object of the present invention to provide a vehicle behavior control that can prevent giving a driver a feeling of erroneous activation due to starting an anti-spin control when there is no need to start it.

In order to achieve the above object, a vehicle behavior control device according to a first aspect of the present invention includes: a first calculation means that calculates a spin amount serving as an index of spin behavior of a vehicle; a control means that performs a braking force control of each wheel of the vehicle to prevent side slip in accordance with the spin amount; a second calculation means that calculates a cornering force corresponding amount of a front wheel; a determination means that determines that the vehicle is not spinning when the cornering force corresponding amount of the front wheel calculated by the second calculation means is within a determined range; and correction means that corrects the spin amount based on the determination result of the determination means.

In this manner, the cornering force corresponding amount of the front wheel is used and compared with a threshold value, in order to determine whether or not the vehicle is spinning. Then, based on the determination result, the spin amount is corrected. Thus, it is possible to prevent the anti-spin control from being activated when there is actually no need to activate the anti-spin control, such as when the vehicle posture is correcting.

For example, according to a second aspect of the present invention, when the determination means determines that the vehicle is not spinning, the correction means may perform a correction to reduce the spin amount.

According to a third aspect of the present invention, the first calculation means may calculate the spin amount including at least a slip angle velocity. The correction means may correct at least the component of the slip angle velocity in the spin amount.

In this manner, by correcting at least the component of the slip angle velocity in the spin amount, instead of correcting all of the spin amount, the effects described in the first and the second aspects of the present invention can be obtained.

For example, according to a fourth aspect of the present invention, the determination means may determine that the vehicle is not spinning when an absolute value of the cornering force corresponding amount of the front wheel calculated by the second calculation means is smaller than the threshold value. In this manner, by comparing the absolute value of the cornering force corresponding amount of the front wheel with the threshold value, it is possible to determine whether or not the vehicle is spinning.

Furthermore, according to a fifth aspect of the present invention, the second calculation means may also calculate a cornering force corresponding amount of a rear wheel. The determination means may determine, by comparing the cornering force corresponding amount of the front wheel and the cornering force corresponding amount of the rear wheel that are calculated by the second calculation means with first and second threshold values, whether the cornering force corresponding amounts are within or outside of a determined range. In this manner, by comparing the cornering force corresponding amounts of the front wheel and the rear wheel with the first and the second threshold values, it is possible to determine whether or not the vehicle is spinning.

In this case, according to a sixth aspect of the present invention, the determination means may determine that the vehicle is not spinning when an absolute value of the cornering force corresponding amount of the front wheel is smaller than the first threshold value and an absolute value of the cornering force corresponding amount of the rear wheel is smaller than the second threshold value.

Moreover, according to a seventh aspect of the present invention, the determination means may determine that the vehicle is not spinning when a square root of a sum of a square of the cornering force corresponding amount of the front wheel calculated by the second calculation means and a square of the cornering force corresponding amount of the rear wheel is smaller than a threshold value.

According to an eighth aspect of the present invention, the determination means may determine that the vehicle is not spinning when a coordinate of the cornering force corresponding amount of the front wheel and the cornering force corresponding amount of the rear wheel that are calculated by the second calculation means is within a predetermined range of the cornering force corresponding amount of the front wheel and the cornering force corresponding amount of the rear wheel.

According to a ninth aspect of the present invention, the second calculation means may also calculate a change amount per unit time of the cornering force corresponding amount. The determination means may determine whether the vehicle is spinning, based on the change amount per unit time, as well as based on a magnitude of the cornering force corresponding amount.

If the change amount per unit time of the cornering force corresponding amount is calculated in this manner, when the change amount per unit time is larger than, for example, a threshold value, it can be determined that the cornering force corresponding amount is soon going to change significantly even if the cornering force corresponding amount has become zero, that is, it can be determined that the vehicle is spinning.

According to a tenth aspect of the present invention, vehicle behavior control device may also calculate a cornering force corresponding amount of a rear wheel of the vehicle and a time derivative of a cornering force corresponding amount of a body of the vehicle. In this case, the vehicle behavior control device may determine whether the cornering force corresponding amounts for the front wheel and the rear wheel are within or outside of a determined range by comparing the cornering force corresponding amount of the front wheel and the cornering force corresponding amount of the rear wheel respectively with first and second threshold values, and also by comparing the time derivative of the cornering force corresponding amount of the body with a third threshold value.

By comparing the time derivative of the cornering force corresponding amount of the body as well as the cornering force corresponding amount of the front wheel and the cornering force corresponding amount of the rear wheel with the thresholds in this manner, it is possible to determine whether the vehicle is spinning or not.

In this case, according to an eleventh aspect of the present invention, the vehicle behavior control device may determine that the vehicle is not spinning when all of first, second, and third conditions are satisfied, wherein the first condition is that the cornering force corresponding amount of the front wheel is smaller than the first threshold value, the second condition is that the cornering force corresponding amount of the rear wheel is smaller than the second threshold value, and the third condition is that the time derivative of the cornering force corresponding amount of the body is smaller than the third threshold value.

Further, according to a twelfth aspect of the present invention, inhibition means is provided. The inhibition means inhibits the braking force control for side slip prevention when the determination means determines that the vehicle is not spinning.

In this manner, when the determination means determines that the vehicle is not spinning, the braking force control for the side slip prevention is inhibited. As a result, it is possible to prevent the anti-spin control from being activated when there is actually no need to activate the anti-spin control, such as when the vehicle posture is correcting.

In the above explanation, the present invention is defined in terms of a device. However, according to an eleventh aspect of the present invention, the present invention is defined in terms of a method. When the invention is implemented as the method, the same effects as those in the device invention can be obtained.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE PREFERRED EMBODIMENTS

Figure 1:
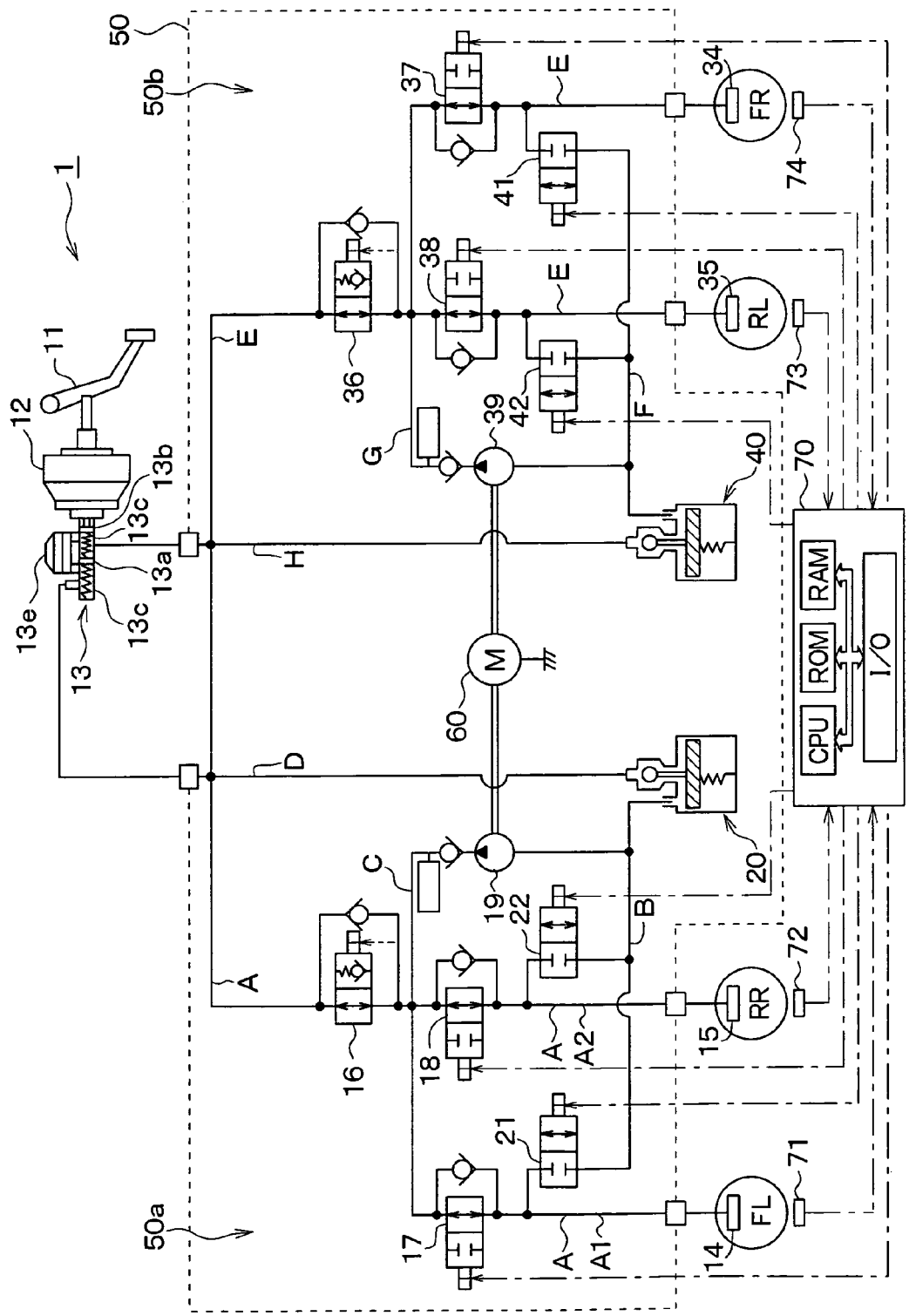
FIG. 1 is a diagram showing the overall structure of a brake control system for a vehicle that realizes a vehicle behavior control according to a first embodiment of the present invention.

Hereinafter, preferred embodiments of the present invention will be described in detail with reference to the appended drawings. Note that elements that are the same or equivalent to each other in the following embodiments are denoted with the same reference numerals in the appended drawings.

(First Embodiment)

A first embodiment of the present invention will now be described. FIG. 1 is a diagram showing the overall structure of a brake control system 1 for a vehicle that realizes a vehicle behavior control according to a first embodiment of the present invention. In the first embodiment, a case will be described in which an anti-side slip control is performed as the vehicle behavior control.

With reference to FIG. 1, when a driver depresses a brake pedal 11, the depression force is doubled by a servo unit 12, and pushes master pistons 13a, 13b located in a master cylinder 13. As a result, the same master cylinder pressure is generated in a primary chamber 13c and a secondary chamber 13d defined by the master pistons 13a, 13b. The master pressure is transmitted to respective wheel cylinders 14, 15, 34, and 35 through a brake fluid control actuator 50.

The master cylinder 13 is provided with a master reservoir 13e having a passage that is in communication with the primary chamber 13c and the secondary chamber 13d.

The, brake fluid pressure control actuator 50 includes a first conduit system 50a and a second conduit system 50b. The first conduit system 50a controls a brake fluid pressure applied to a left front wheel FL and a right rear wheel RR, and the second conduit system 50b controls a brake fluid pressure applied to a right front wheel FR and a left rear wheel RL.

The first conduit system 50a and the second conduit system 50b have a similar structure. Accordingly, in the following description, only the first conduit system 50a will be explained and the explanation of the second conduit system 50b will be omitted.

The first conduit system 50a includes a conduit A serving as a main conduit. The conduit A transmits the aforementioned master cylinder pressure to the wheel cylinder 14 provided at the left front wheel FL and the wheel cylinder 15 provided at the right rear wheel RR to generate a wheel cylinder pressure.

The conduit A includes a first differential pressure control valve 16 that can be controlled to a communicated state and a differential pressure state. The valve position of the first differential pressure control valve 16 is adjusted such that the first differential pressure control valve 16 is in the communicated state during a normal braking operation in which the driver depresses the brake pedal 11 (when the vehicle behavior control is not being performed). When an electric current is applied to a solenoid coil provided in the first differential pressure control valve 16, the valve position is adjusted such that the pressure difference becomes larger as the value of the electric current is increased.

When the first differential pressure control valve 16 is in the differential pressure state, the brake fluid is allowed to flow from the side of the wheel cylinders 14, 15 to the side of the master cylinder 13 only when the brake fluid pressure on the side of the wheel cylinders 14, 15 is higher than the master cylinder pressure by a determined pressure or more. Therefore, the brake fluid pressure on the side of the wheel cylinders 14, 15 is normally maintained not to become higher than the pressure on the master cylinder 13 side by the determined pressure or more.

The conduit A branches into two conduits A1 and A2 on the side of the wheel cylinders 14, 15 downstream of the first differential pressure control valve 16. A first boost control valve 17 is provided in the conduit A1, and controls the increase in brake fluid pressure to the wheel cylinder 14. A second boost control valve 18 is provided in the conduit A2, and controls the increase in brake fluid pressure to the wheel cylinder 15.

The first and the second boost control valves 17, 18 are formed by a two-position electromagnetic valve that can be controlled to a communicated state and a closed state.

The first and the second boost control valves 17, 18 are normally open valves. When a control current applied to solenoid coils provided in the first and the second boost control valves 17, 18 is zero (i.e. when no current is applied), the first and the second boost control valves 17, 18 are controlled to the communicated state, and when the control current is applied to the solenoid valves, they are controlled to the closed state.

A conduit B serving as a pressure reducing conduit connects a section of the conduit A between the first boost control valve 17 and the wheel cylinder 14 with a pressure adjusting reservoir 20, and connects a section of the conduit A between the second boost control valves 18 and the wheel cylinder 15 with the pressure adjusting reservoir 20. The conduit B is provided with a first pressure reducing control valve 21 and a second pressure reducing control valve 22 each formed by a two-position electromagnetic valve that can be controlled to a communicated state and a closed state. The first and the second pressure reducing control valves 21, 22 are normally closed valves.

Further, a conduit C serving as a reflux conduit is provided between the pressure adjusting reservoir 20 and the conduit A serving as the main conduit. The conduit C is provided with a self-priming pump 19 that is driven by a motor 60. The self-priming pump 19 sucks up brake fluid from the pressure adjusting reservoir 20 and discharges it to the master cylinder 13 side or the wheel cylinders 14, 15 side. The motor 60 is driven by the control of the power supply to a motor relay (not shown in the drawings).

Furthermore, a conduit D serving as an auxiliary conduit is provided between the pressure adjusting reservoir 20 and the master cylinder 13. The brake fluid is sucked through the conduit D by the pump 19 from the master cylinder 13 and is discharged to the conduit A. As a result, the brake fluid is supplied to the wheel cylinders 14, 15 side during a vehicle behavior control, such as an anti-side slip control, a traction control (TCS) or the like, thereby increasing the wheel cylinder pressure of a target wheel.

Figure 2:
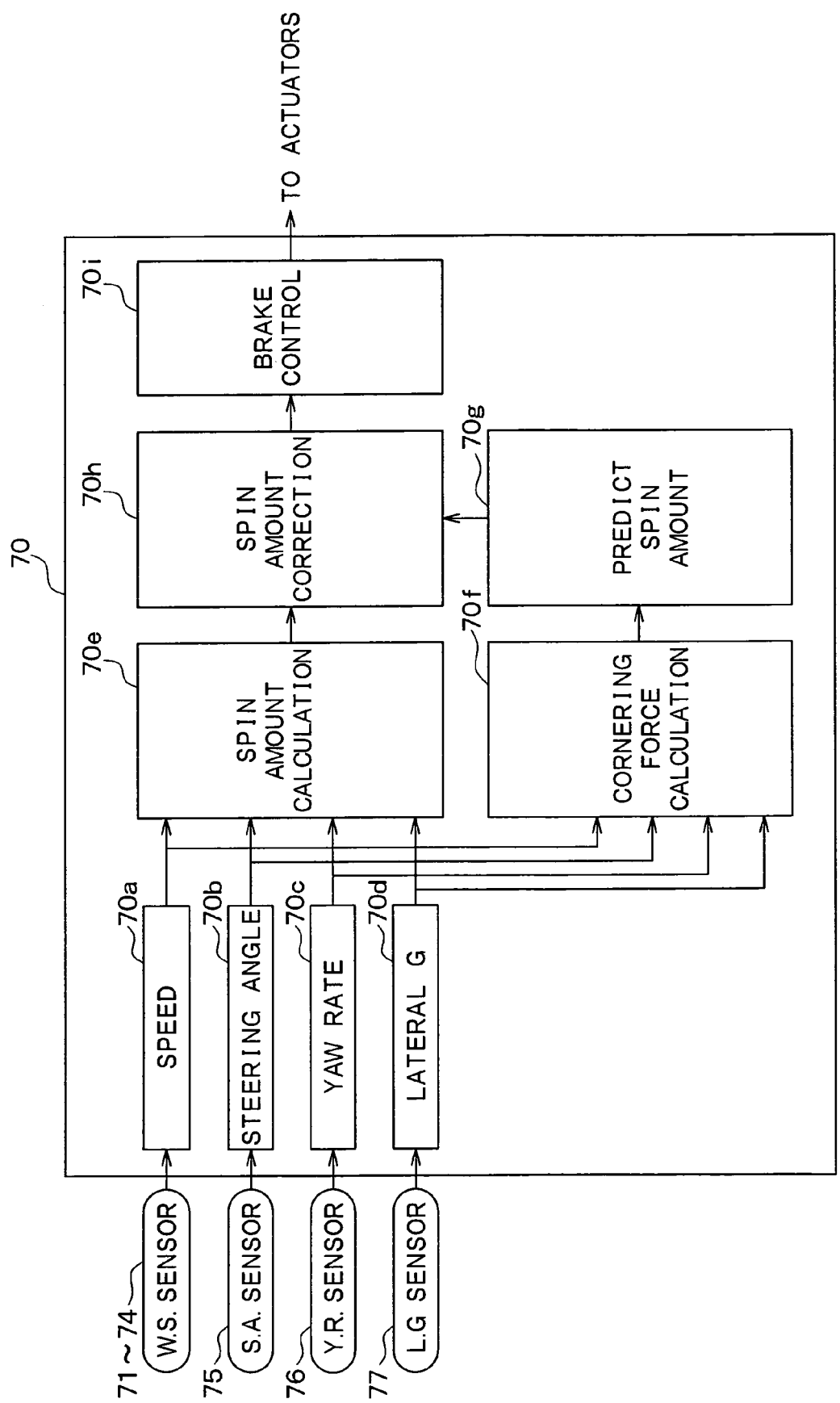
FIG. 2 is a block diagram showing the relationship between the input and the output of a signal of a brake ECU.

A brake ECU 70, which corresponds to a vehicle behavior control device of the present invention, controls a control system of the brake control system 1. The brake ECU 70 is a known microcomputer provided with a central processing unit (CPU), a read only memory (ROM), a random access memory (RAM), an input/output (I/O) port, and the like. The brake ECU 70 performs processing, such as various types of calculation, according to programs stored in the ROM and the like. FIG. 2 is a block diagram showing the relationship between the input and the output of a signal of the brake ECU 70.

As shown in FIG. 2, the brake ECU 70 receives detection signals from wheel speed sensors 71 to 74 provided at respective wheels FL to RR, a steering angle (wheel heading angle) sensor 75, a yaw rate sensor 76, and a lateral G sensor 77, and performs calculations of various types of physical quantities and vehicle behavior controls such as the anti-side slip control. More concretely, the brake ECU 70 includes a speed calculation portion 70a, a steering angle calculation portion 70b, a yaw rate calculation portion 70c, a lateral G calculation portion 70d, a spin amount calculation portion 70e, a cornering force corresponding amount calculation portion 70f, a spin amount prediction portion 70g, a spin amount correction portion 70h, and a braking force control portion 70i.

The speed calculation portion 70a, the steering angle calculation portion 70b, the yaw rate calculation portion 70c, the lateral G calculation portion 70d calculate the wheel speed of each of the wheels FL to RR, the vehicle body speed (estimated vehicle body speed), the wheel slip ratio, the steering angle that corresponds with the operation amount of the steering wheel by the driver, and the yaw rate and lateral G that are actually generated in the vehicle, based on detection signals from the respective sensors 71 to 77. The spin amount calculation portion 70e and the cornering force corresponding amount calculation portion 70f correspond to first calculation means and second calculation means, respectively, and calculate the spin amount and the cornering force corresponding amount based on the calculated vehicle body speed, steering angle, yaw rate and lateral G. Next, the spin amount and the cornering force corresponding amount will be described.

The spin amount is a parameter used as a side slip index of the vehicle body. For example, the linear sum of a slip angle $\beta$ of the vehicle body and a slip angle velocity $\beta'$ that corresponds to the derivative value of the slip angle $\beta$, or the side-slip acceleration defined by the deviation (Gy−V×Yr) between the lateral G Gy and the product of the vehicle speed V and the yaw rate Yr may be used as the spin amount. The cornering force corresponding amount is the cornering force itself, or a physical quantity corresponding to the cornering force. In this embodiment, a front wheel slip angle $\beta f$, which is a physical quantity corresponding to the cornering force of the front wheel, is obtained as the cornering force corresponding amount.

Figure 3:
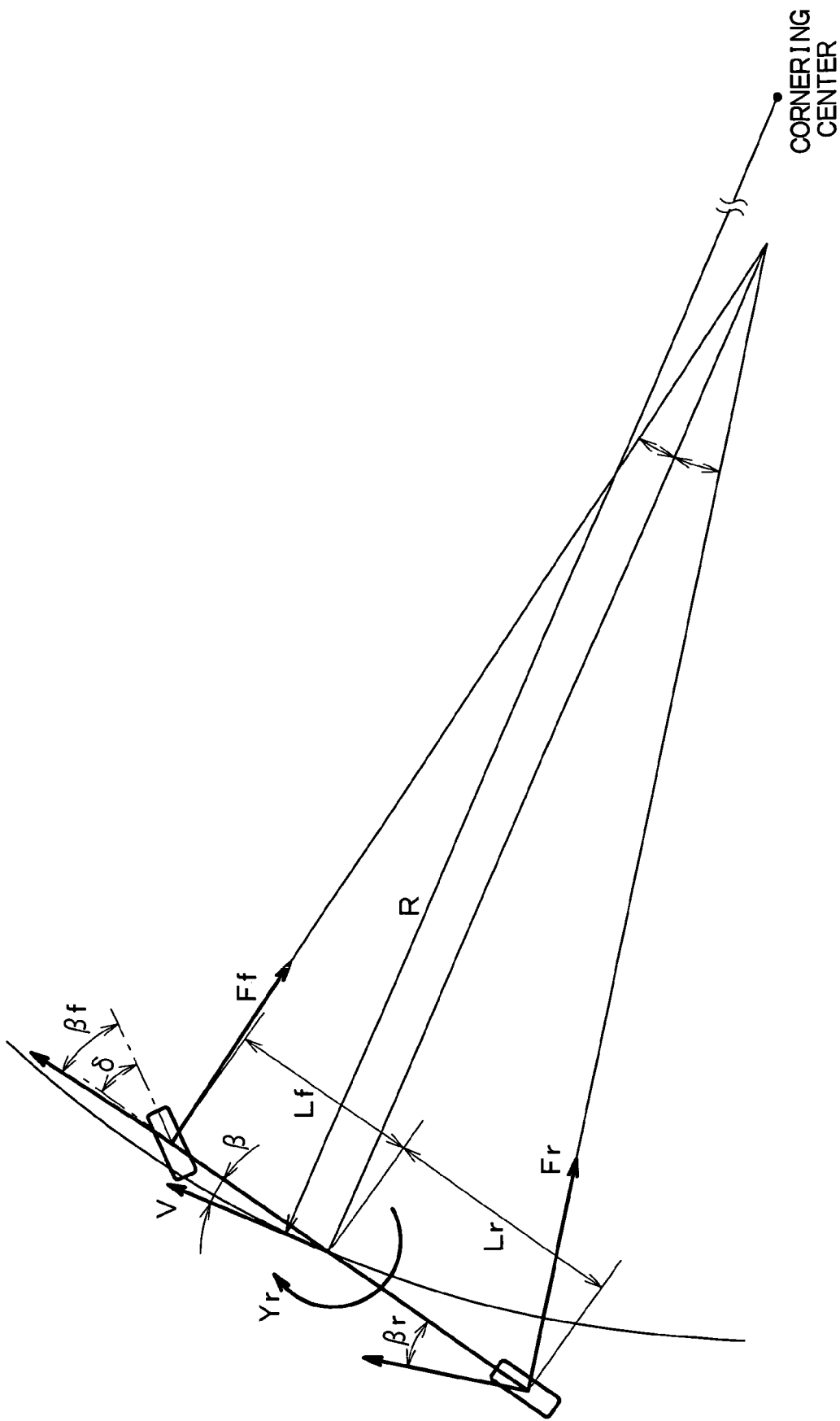
FIG. 3 is a diagram of a two-wheel model showing various parameters used to derive a steady cornering equation of the vehicle.

FIG. 3 is a diagram of a two-wheel model showing various parameters used to derive a steady cornering equation of the vehicle. In the diagram, the steady cornering of a four-wheel vehicle is replaced by the two-wheel model equivalent. In the diagram, the reference character V denotes the vehicle body speed, Yr denotes the yaw rate, R denotes the turning radius, Lf denotes the distance from the vehicle center of gravity to the front axle, Lr denotes the distance from the vehicle center of gravity to the rear axle, $\delta$ denotes the front wheel steering angle, Ff denotes the front wheel cornering force (corresponding to the resultant force of the left and right front wheels), Fr denotes the rear wheel cornering force (corresponding to the resultant force of the left and right rear wheels), St denotes the steering angle of the steering handle, n denotes the steering ratio (steering gear ratio), M denotes the inertial mass, Cpf denotes the front wheel cornering power (corresponding to the resultant force of the left and right front wheels), and Cpr denotes the rear wheel cornering power (corresponding to the resultant force of the left and right rear wheels)

The cornering force of the front wheels and the cornering force of the rear wheels are respectively expressed by the following equations.

$$Ff=Cpf \times \beta f \quad \text{(Equation 1)}$$

$$Fr=Cpr \times \beta r \quad \text{(Equation 2)}$$

Further, the following equations are derived from the equilibrium of the cornering force and moment.

$$Ff+Fr=MV2/R \quad \text{(Equation 3)}$$

$$Ff \times Lf - Fr \times Lr = 0 \quad \text{(Equation 4)}$$

On the other hand, the front wheel slip angle $\beta f$ and the rear wheel slip angle $\beta r$ are obtained from the following equations.

$$\beta f = \beta - Lf/R + \delta \quad \text{(Equation 5)}$$

$$\beta r = \beta + Lr/R \quad \text{(Equation 6)}$$

Here, if $\delta$ and the yaw rate of the cornering is simplified by assuming the slip angle $\beta=0$, the following equations are established.

$$\delta = St/n \quad \text{(Equation 7)}$$

$$Yr = V/R \quad \text{(Equation 8)}$$

Furthermore, since the slip angle velocity $\beta'$ is obtained from the following Equation 9, the slip angle $\beta$ can be obtained as the integral value of the slip angle velocity $\beta'$ based on Equation 10. Note that Gy in Equation 9 denotes the lateral G.

$$\beta' = Gy/V - Yr \quad \text{(Equation 9)}$$

$$\beta = \int \beta' dt \quad \text{(Equation 10)}$$

Accordingly, as described above, V, St, Yr, and Gy have already been calculated based on the detection signals from the various sensors 71 to 77, and Lf, Lr, n, and M are given physical quantities. Therefore, if the slip angle velocity $\beta'$ is obtained based on Equation 9, the slip angle $\beta$ can be obtained by substituting the slip angle velocity $\beta'$ in Equation 10. By substituting the thus obtained slip angle $\beta$ in Equations 5 and 6, the front wheel slip angle $\beta f$ and the rear wheel slip angle $\beta r$ can be obtained. Then, by obtaining Ff and Fr based on Equations 1 to 4, the cornering force can be obtained. Moreover, the cornering force is shown by the function equations of $\beta f$ and $\beta r$ as shown by Equations 1 and 2, and $\beta f$ and $\beta r$ are shown by the function equations of $\beta$ as shown by Equations 5 and 6. Accordingly, $\beta f$ and $\beta r$ can be used as physical quantities corresponding to the cornering force.

In this embodiment, the spin amount calculation portion 70e obtains a value as a spin amount SV, by substituting in a function $g(\beta', \alpha)$ the slip angle $\beta$ of the vehicle body and the slip angle velocity $\beta'$ corresponding to the derivative value of the slip angle $\beta$. For example, the function $g(\beta', \beta)$ is expressed as shown by Equation 11. Note that K1 and K2 in Equation 11 are determined coefficients.

$$SV = g(\beta', \beta) = K1 \times \beta' + K2 \times \beta \quad \text{(Equation 11)}$$

Further, in this embodiment, the cornering force corresponding amount calculation portion 70f obtains the front wheel slip angle $\beta f$ as the cornering force corresponding amount. In this manner, the spin amount calculation portion 70*e* and the cornering force corresponding amount calculation portion 70*f* calculate the spin amount and the cornering force corresponding amount.

The spin amount prediction portion 70*g* corresponds to determination means that determines whether or not the vehicle is spinning. The spin amount prediction portion 70*g* predicts the spin amount based on the cornering force corresponding amount obtained by the cornering force corresponding amount calculation portion 70*f*. More specifically, the spin amount prediction portion 70*g* predicts whether the spin amount SV is tending to diverge and the vehicle behavior is tending to become unstable or whether the spin amount SV is tending to converge and the vehicle behavior is tending to become stable, and uses this as a basis for determining whether or not the vehicle is spinning. When the vehicle behavior is becoming unstable, it is necessary to perform an anti-spin control. Meanwhile, when the vehicle behavior is becoming stable, there are some cases when there is actually no need to perform the anti-spin control even if the spin amount SV exceeds a threshold value to start the anti-spin control, such as when the vehicle posture is being corrected. For this reason, the spin amount prediction portion 70*g* predicts the tendency of the spin amount SV and thereby determines whether or not the vehicle is spinning. When it is determined that the vehicle is not spinning, the anti-spin control is made difficult to start or is not started.

In this embodiment, it is determined whether or not the front wheel slip angle βf is within a determined range. More specifically, it is determined whether or not the absolute value |βf| of the front wheel slip angle βf is smaller than a threshold value ThA. Based on the determination result, it is determined whether the spin amount SV is tending to diverge and the vehicle behavior is tending to become unstable or whether the spin amount SV is tending to converge and the vehicle behavior is tending to become stable, thereby predicting whether or not there is a possibility of an increase in the spin amount SV. The front wheel slip angle βf is the discrepancy between the rolling direction of the tire when the vehicle turns and the traveling direction of the vehicle. If the front wheel slip angle βf increases, the cornering force also increases. Therefore, it is determined whether the spin amount SV is tending to diverge or tending to converge, by comparing the front slip angle βf with the threshold value ThA.

Figure 4:
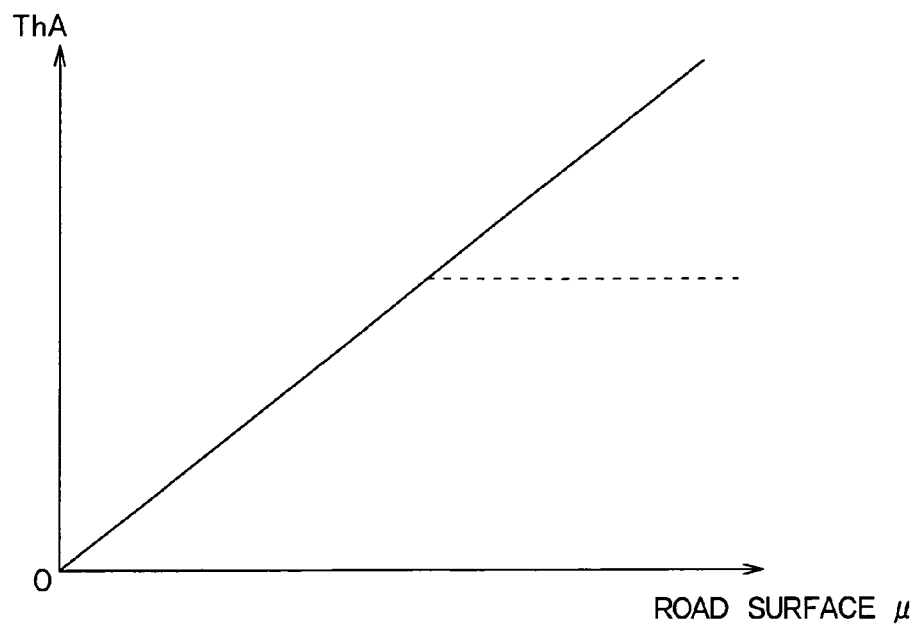
FIG. 4 is a map showing the relationship between a road surface $\mu$ and a threshold value ThA.

The threshold value ThA is a value to determine whether the spin amount SV is tending to diverge or tending to converge, and can be set to a fixed value. However, the threshold value ThA may be varied in accordance with a road surface friction coefficient (hereinafter referred to as a road surface μ). For example, as shown by the map in FIG. 4 that shows the relationship between the road surface μ and the threshold value ThA, the threshold value ThA may be set such that it becomes larger as the road surface μ becomes larger. In addition, as shown by the dotted line in FIG. 4, an upper limit value may be set to the threshold value ThA.

In related art, there are some cases where the slip angle velocity β' reaches a certain value enough to cause the coordinate of β and β' to exceed the boundary and to enter the unstable region as if spin behavior appears is occurring, even when the vehicle posture is being corrected and the value of the slip angle β is small. However, in this embodiment, because the cornering force of a tire is used as an index, it is possible to reduce the influence of each factor and to reduce ambiguities in determining whether or not the spin behavior is occurring.

The spin amount correction portion 70*h* corresponds to correction means, and corrects the spin amount SV obtained by the spin amount calculation portion 70*e*, based on the prediction result of the spin amount prediction portion 70*g*. For example, when a prediction result that the spin amount SV is tending to converge is obtained, the spin amount SV is multiplied by a correction coefficient $\alpha (0 \leq \alpha < 1)$ to obtain the corrected spin amount SV. Since the correction coefficient α is set to $0 \leq \alpha < 1$, the spin amount correction portion 70*h* corrects the spin amount SV such that when the spin amount SV is tending to converge, the anti-spin control is made difficult to start or is not started. More specifically, the anti-spin control can be inhibited by setting α=0, and the anti-spin control can be made difficult to be started by setting $0 < \alpha < 1$. Thus, it is possible to inhibit the anti-spin control from performing when there is actually no need to perform the anti-spin control, such as when the posture of the vehicle is corrected.

Figure 5:
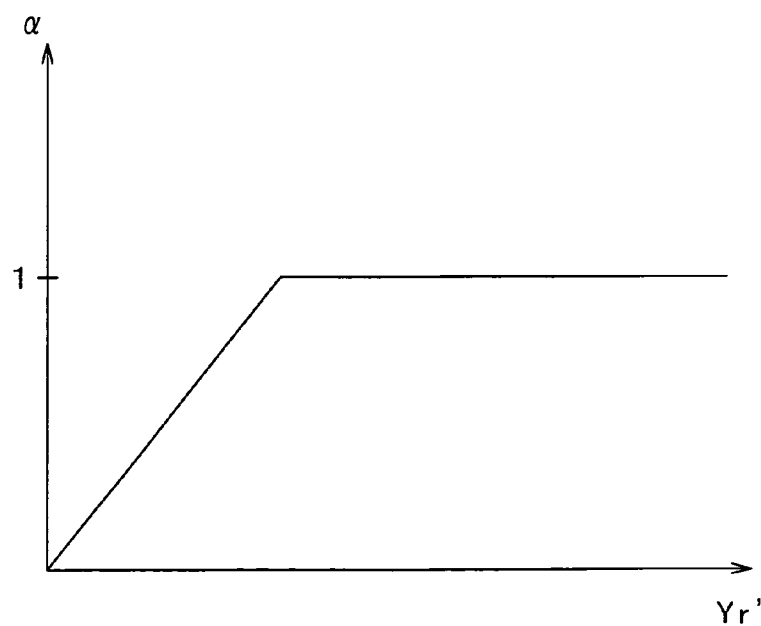
FIG. 5 is a map showing the relationship between a derivative value Yr' of a yaw rate and $\alpha$.

Note that the correction coefficient α may be set in accordance with the derivative value Yr' of the yaw rate as shown in FIG. 5. This is because when the yaw rate is tending to diverge (Yr'>0), the feeling of erroneous activation felt by the driver is weakened. On the other hand, when the yaw rate is tending to converge (Yr'<0), the feeling of erroneous activation felt by the driver is strengthened. Alternatively, the correction coefficient α may be determined based on a cornering force corresponding amount (for example, |βf|, $(\beta f^2 + \beta r^2)^{1/2}$ etc.).

The braking force control portion 70*i* corresponds to control means, and determines whether or not a braking force control is to be performed in order to realize the anti-side slip control such as the anti-spin control based on the spin amount SV. When the braking force control is performed, the braking force control portion 70*i* determines a wheel that is a target of control (a control target wheel) based on the spin amount SV, the front wheel steering angle δ and the like, and calculates the control amount of the control target wheel, namely, the slip ratio. Based on the calculation results, the brake ECU 70 performs controls of respective actuators in which currents supplied to each of the control valves 16 to 18, 21, 22 and control valves 36 to 38, 41, 42 are controlled and current amounts of the motor 60 for driving the pump 19 and a pump 39 are controlled.

For example, when a wheel cylinder pressure is generated with the left front wheel FL as the control target wheel, in order to perform the anti-spin control when turning to the right, the motor 60 is turned on by setting the first differential pressure control valve 16 to a differential pressure state, thereby driving the pump 19. As a result, the brake fluid pressure downstream of the first differential pressure control valve 16 (on the wheel cylinder side) becomes higher due to the differential pressure generated by the first differential pressure control valve 16. At this time, the second boost control valve 18 corresponding to the right rear wheel RR as a non-control target wheel is closed so that the wheel cylinder 15 is not pressurized. In this state, electric current is not applied to the first boost control valve 17 corresponding to the left front wheel FL as the control target wheel, or the amount of electric current applied to the first boost control valve 17 is adjusted (for example, by duty control). Thus, a desired wheel cylinder pressure is generated in the wheel cylinder 14.

Note that, although the pump 39 is also driven by the motor 60, unless the second differential pressure control valve 36 is set to a differential pressure state, the brake fluid only circulates and the wheel cylinders 34, 35 are not pressurized.

This completes the description of the structure of the brake control system 1 of this embodiment. Next, the specific operation of the brake control system 1 will be described. Note that the brake control system 1 can perform an anti-side slip (ABS) control and the like as a vehicle behavior control, in addition to a normal brake control. The basic operations of these controls are the same as those of the related art, so only the operation relating to the anti-side slip control, which relates to the key feature of the present invention, will be described.

Figure 6:
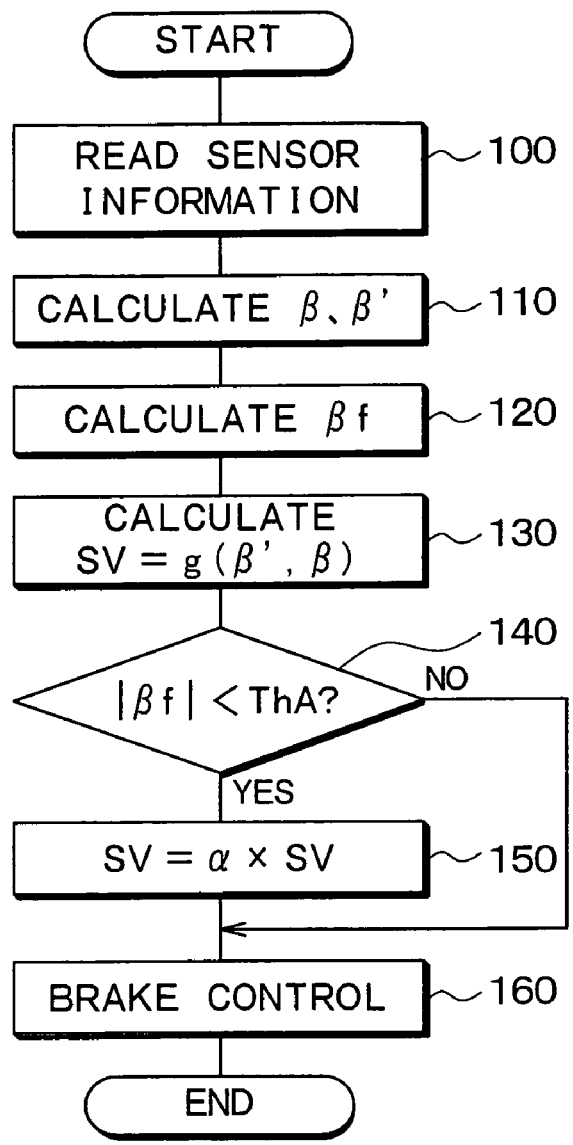
FIG. 6 is a flow chart of an anti-side slip control process.

FIG. 6 is a flow chart of an anti-side slip control process, which is performed by the brake ECU 70. The anti-side slip control process is performed when an ignition switch (not shown in the drawings) provided in the vehicle is turned on, or at a determined calculation interval while vehicle is running.

First, at step 100, a reading process of various sensor signals is performed. More specifically, various detecting signals necessary for the anti-side slip control, such as signals from the wheel speed sensors 71 to 74, the steering angle sensor 75, and the yaw rate sensor 76 are read. Then, based on the read signals, various physical values are calculated. Thus, the wheel speeds of the respective wheels FL to RR, the vehicle body speed, the wheel slip ratio, the steering angle, the yaw rate, and the lateral G are calculated.

Subsequently, at step 110, the slip angle β and the slip angle velocity β' are calculated. First, the slip angle velocity β' is calculated by substituting in Equation 9 the vehicle body speed, the yaw rate, and the lateral G calculated at step 100. Then, the slip angle β is calculated by integrating the calculation result of the slip angle velocity β' as shown by Equation 10.

Next, at step 120, the front wheel slip angle βf is calculated. The front wheel slip angle βf is calculated by substituting the slip angle β calculated at step 110 in Equation 5 described above. Note that, in Equation 5, Lf is a fixed value that is determined by the vehicle type etc., δ is a value calculated from Equation 7, and the turning radius is a value calculated from Equation 8. Therefore, if the slip angle β is determined, the front wheel slip angle βf can be calculated.

At step 130, the spin amount SV is calculated. More specifically, the spin amount SV is calculated by substituting the slip angle β and the slip angle velocity β' in Equation 11 described above.

Then, at step 140, it is determined whether or not the absolute value |βf| of the front wheel slip angle βf is smaller than the threshold value ThA. Based on this, it is determined whether the spin amount SV is tending to diverge and the vehicle behavior is tending to become unstable or whether the spin amount SV is tending to converge and the vehicle behavior is tending to become stable, thereby predicting whether or not there is a possibility of an increase in the spin amount SV. If an affirmative determination is made, it is predicted that the spin amount SV is tending to converge and the vehicle behavior is tending to become stable. On the other hand, if a negative determination is made, it is predicted that the spin amount SV is tending to diverge and the vehicle behavior is tending to become unstable.

If an affirmative determination is made at step 140, the routine proceeds to step 150, where the spin amount SV is corrected to a smaller value. More specifically, as shown by the following equation, the spin amount SV is multiplied by a correction coefficient α(0≦α<1), thereby obtaining the corrected spin amount SV. Thereafter, the routine proceeds to step 160.

$$SV = \alpha \times SV \quad \text{(Equation 12)}$$

On the other hand, if a negative determination is made at step 140, the routine proceeds to step 160 without correcting the spin amount SV. At step 160, a braking force control based on the spin amount SV is performed.

Figure 7:
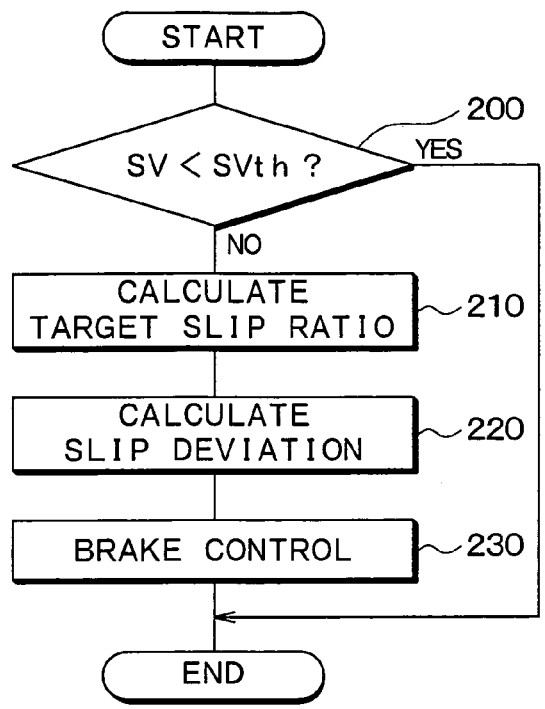
FIG. 7 is a flow chart showing one example of a braking force control based on a spin amount SV.

FIG. 7 is a flow chart showing one example of the braking force control based on the spin amount SV.

First, at step 200, it is determined whether or not the spin amount SV is smaller than a threshold value SVth that is used to determine whether or not to perform the braking force control. When the spin amount SV is smaller than the threshold value SVth, side-slipping does not occur significantly, and there is no need to perform the braking force control. Therefore, when the affirmative determination is made at step 200? the process ends at this time. On the other hand, when the negative determination is made, the routine proceeds to step 210.

Figure 8:
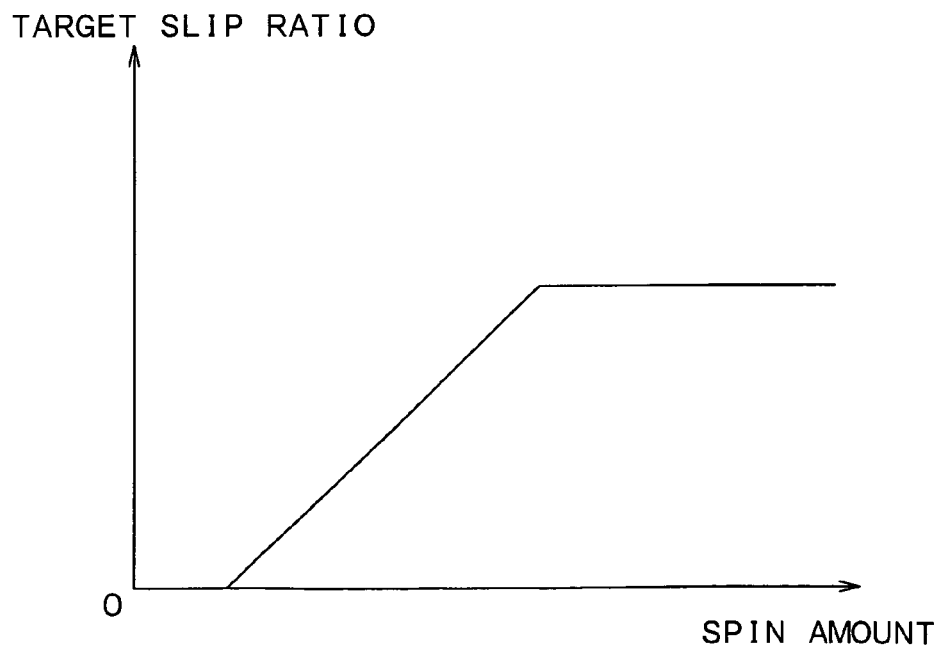
FIG. 8 is a map showing the relationship between the spin amount SV and a target slip ratio.

Then, at step 210, the front wheel of the wheels at the outside of the vehicle as it corners is set as a control target wheel, and the target slip ratio of the control target wheel is calculated based on the spin amount SV. The target slip ratio is calculated based on the map in FIG. 8 that shows the relationship between the spin amount SV and the target slip ratio. Next, at step 220, the slip ratio of the control target wheel is selected from among the wheel slip ratio s obtained at step 100. Then, a slip deviation, which is a difference between the target slip ratio calculated at step 210 and the wheel slip ratio of the control target wheel, is calculated. Then, at step 230, in order to reduce the slip deviation to zero, the current supply control to each of the control valves 16 to 18, 21, 22, 36 to 38, 41 and 42, and the current amount control of the motor 60 for driving the pumps 19 and 39 are performed. Although a known example is described as the braking force control, another control method may be adopted.

As described above, in this embodiment, when it is predicted at step 150 that the spin amount SV is tending to converge and the vehicle behavior is tending to become stable, the spin amount SV is corrected to a smaller value. As a result, it is difficult to perform the braking force control at step 200. Therefore, it is possible to prevent the anti-spin control from being performed when there is actually no need to perform the anti-spin control, such as when the vehicle posture is corrected. Therefore, it is possible to prevent unnecessary performance of the anti-spin control giving the driver a feeling of erroneous activation or an unpleasant sensation. Moreover, an uncomfortable sensation such as kickback to the steering wheel can be prevented.

Figure 9:
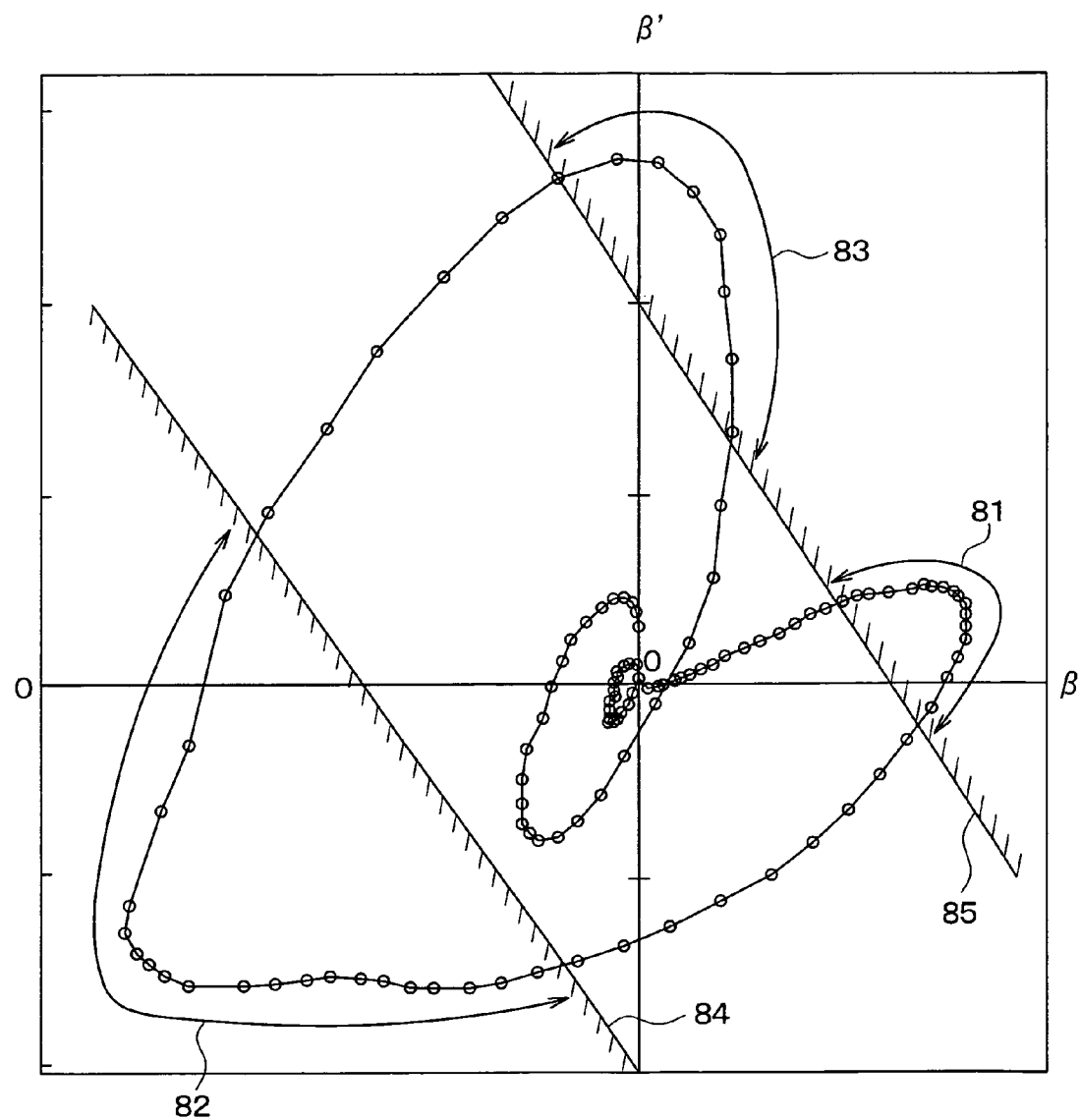
FIG. 9 is a view showing a trajectory of a $\beta r$-$\beta'$ state in two dimensions.
Figure 10:
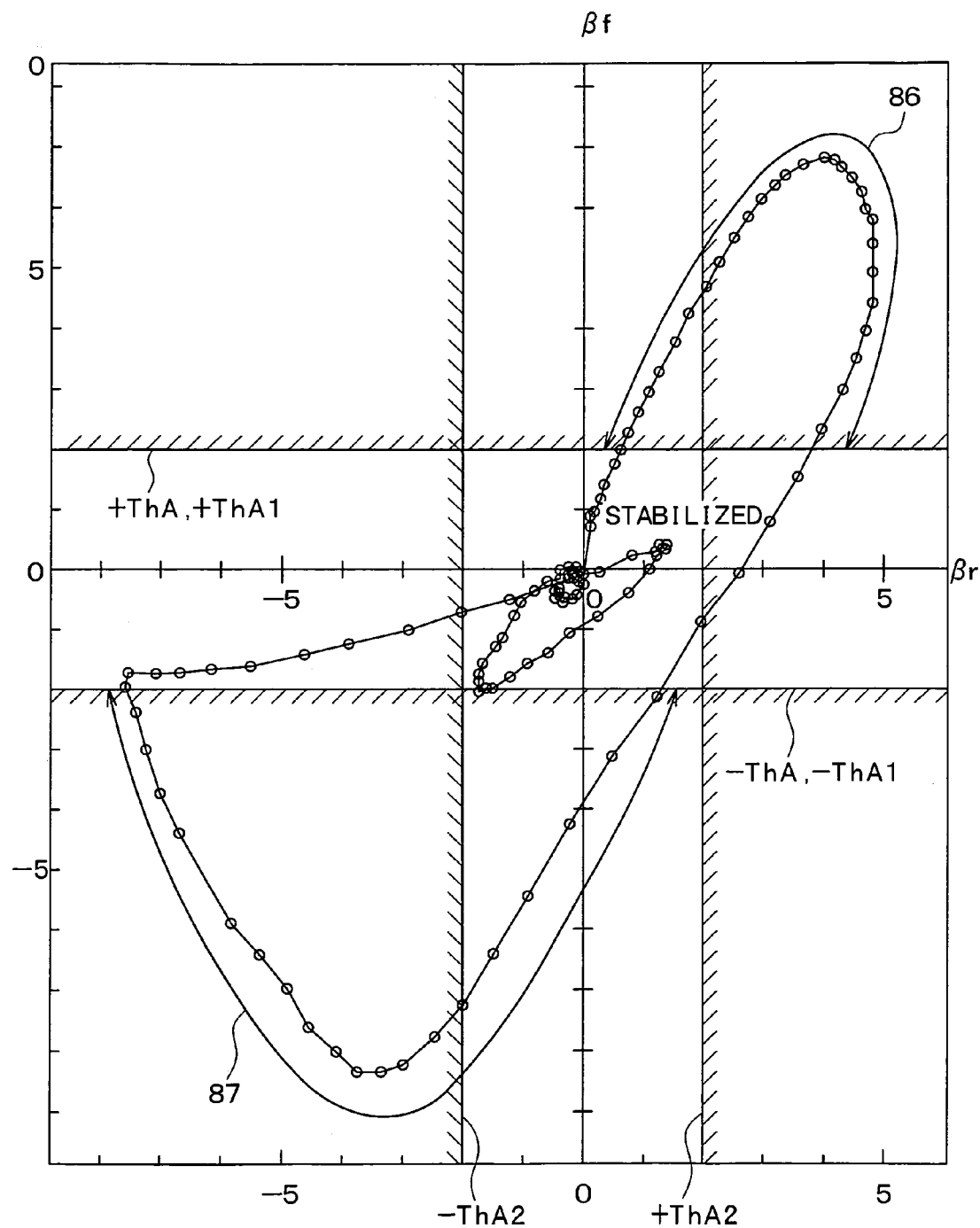
FIG. 10 is a view showing a trajectory of a $\beta f$-$\beta r$ state in two dimensions.
Figure 11:
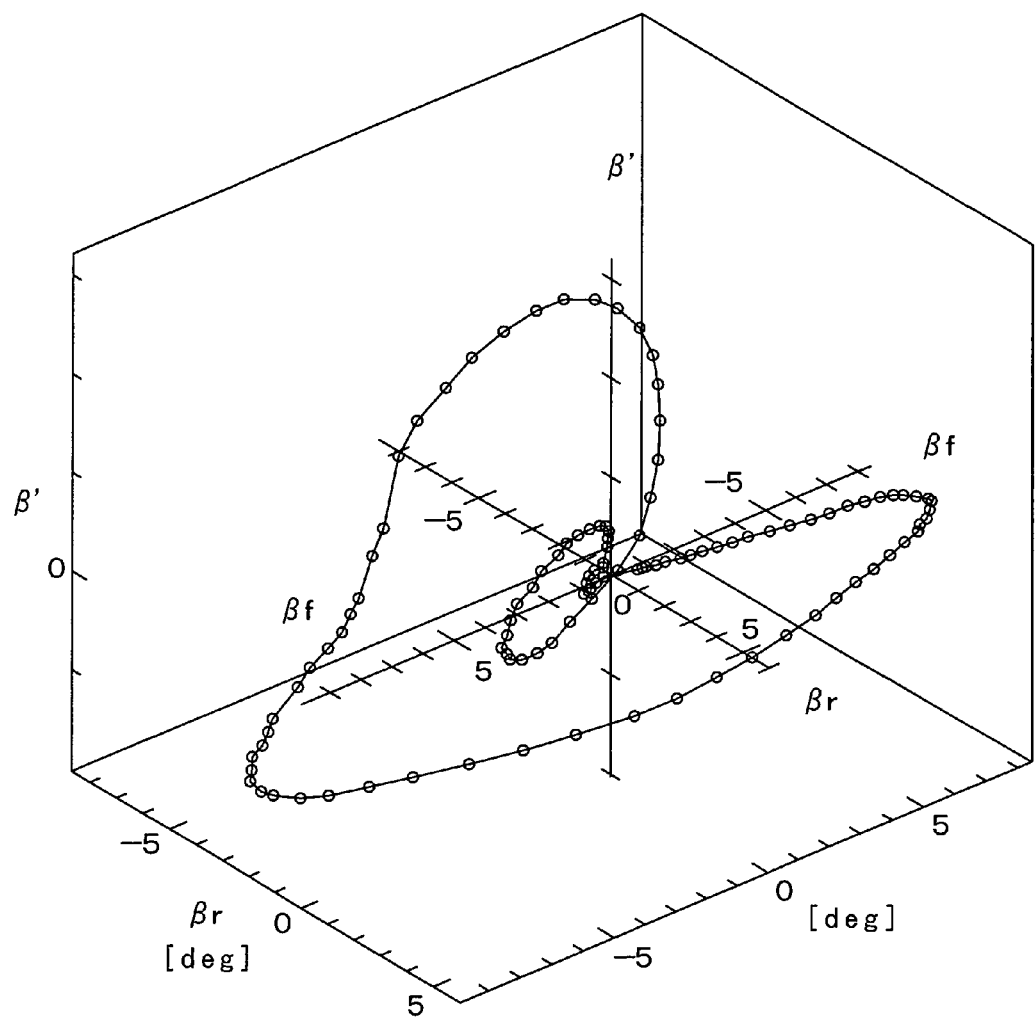
FIG. 11 is a view showing a trajectory of a $\beta'$-$\beta f$-$\beta r$ space.

FIGS. 9 to 11 respectively show the trajectory of the βr-β' state in two dimensions, the trajectory of the βf-βr state in two dimensions, and the trajectory in the β'-βf-βr space when the driver turns back the steering wheel to direct the vehicle in the traveling direction after turning of the steering wheel in a direction the driver wanted to go, in the case of changing lane or the like.

The βr-β' state in two dimensions shown in FIG. 9 corresponds to the plane when viewed from the axial direction of the front wheel slip angle βf in FIG. 11. The trajectory of this plane is used for a known anti-spin control described in, for example, Japanese Patent Application Publication No. JP-A-H7-215190.

As can be seen from the trajectory of the βr-β' state in two dimensions, the slip angle βr or the slip angle velocity β' becomes larger at three areas 81 to 83 in FIG. 9 respectively corresponding to when the steering wheel is turned in, when the steering wheel is turned back, and when the vehicle posture is stabilized. Accordingly, if boundary lines 84 and 85 described in JP-A-H7-215190 is set as shown in FIG. 9, the boundary lines are exceeded at these three areas 81 to 83.

Note that FIG. 11 is a three-dimensional perspective view, so that the intersection points of the respective axes and the trajectory in FIG. 11 are different from those in FIG. 9 and FIG. 10. However, if the view direction of the three-dimensional view shown in FIG. 11 is changed to the respective directions shown in FIG. 9 and FIG. 10, they correspond with each other.

On the other hand, the βf-βr state in two dimensions shown in FIG. 10 corresponds to the plane when viewed from the axial direction of the slip angle velocity β' in FIG. 11. As can be seen from the trajectory of the βf-βr state in two dimensions shown in FIG. 10, the front wheel slip angle βf becomes larger and exceeds the above-described threshold value ThA at two areas 86 and 87 in FIG. 10 corresponding to when the steering wheel is turned in and when the steering wheel is turned back. However, when the vehicle posture is being stabilized, the front wheel slip angle βf does not exceed the threshold value ThA. That is, in related art, the anti-spin control is performed only based on the trajectory of the β-β' state in two dimensions. However, it is actually not possible to distinguish between the case when the steering wheel is turned in or turned back and the case when the vehicle posture is stabilized, only based on the trajectory of the β-β' state in two dimensions. On the contrary, in this embodiment, for example, the front slip angle βf that appears as the trajectory of the βf-βr state in two dimensions is used to determine the tendency of the spin amount SV. More specifically, when the absolute value |βfβ of the front wheel slip angle βf exceeds the threshold value ThA, it is determined that the spin amount SV is tending to diverge and the vehicle behavior is tending to become unstable, and when the absolute value |βf| does not exceed the threshold value ThA, it is determined that the spin amount SV is tending to converge and the vehicle behavior is tending to become stable. Accordingly, it is possible to predict whether there is a possibility of an increase in the spin amount SV.

(Second Embodiment)

A second embodiment of the present invention will now be described. In the second embodiment, a prediction method of the anti-side slip control in the spin amount prediction portion 70g is different from that in the first embodiment, but other features are the same as the first embodiment. Accordingly, only the different points will be described.

Figure 12:
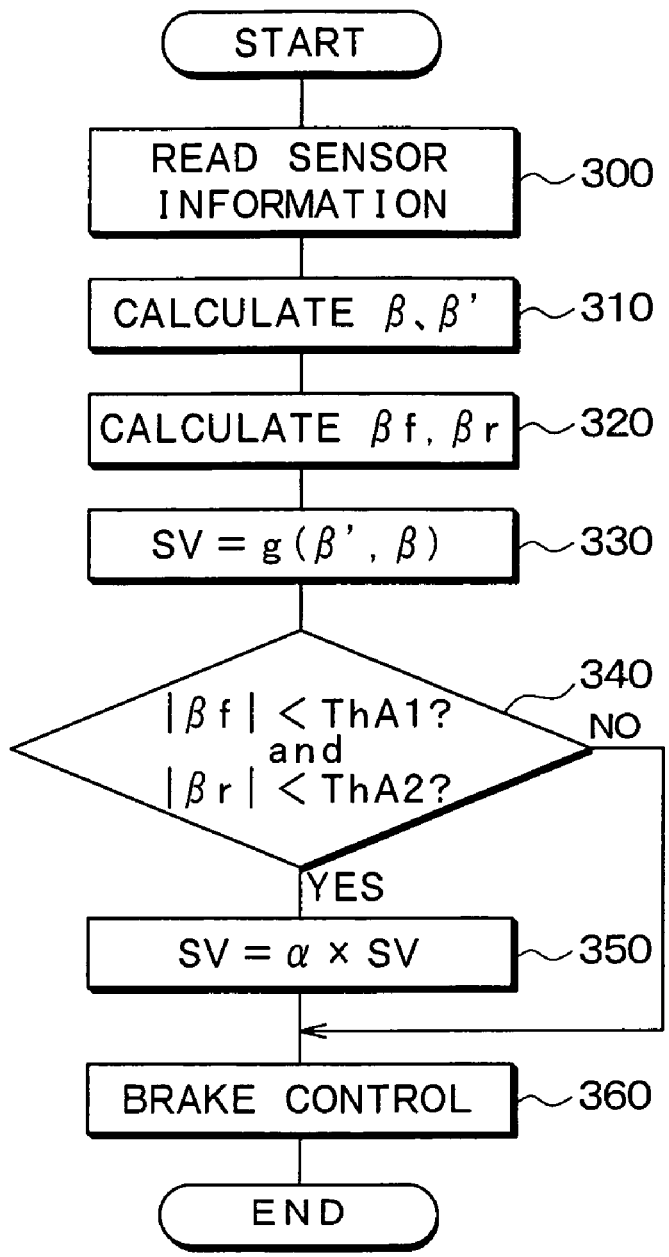
FIG. 12 is a flow chart of an anti-side slip control process according to a second embodiment of the present invention.

FIG. 12 is a flow chart of an anti-side slip control process, which is performed by the brake ECU 70.

First at steps 300 and 310, the wheel speed, the vehicle body speed, the wheel slip ratio, the steering angle, the yaw rate and the lateral G, as well as the slip angle β and the slip angle velocity β', are calculated by similar processes as those performed at steps 100 and 110 shown in FIG. 6. Subsequently, at step 320, the rear wheel slip angle βr that corresponds to the cornering force corresponding amount of the rear wheel is calculated, in addition to the front wheel slip angle βf. The front slip angle βf is calculated using a similar method to that used at step 120, and the rear wheel slip angle βr is calculated by substituting the slip angle β calculated at step 310 in Equation 6 described above.

Next, at step 330, the spin amount SV is calculated by a similar process to that used at step 130. After that, at step 340, it is determined whether all of following two conditions are satisfied or not. The first one of the conditions is that the absolute value |βf| of the front wheel slip angle βf is smaller than a threshold value ThA1. The second one of the conditions is that the absolute value |βr| of the rear wheel slip angle βr is smaller than a threshold value ThA2. Based on the determination, it is determined whether the spin amount SV is tending to diverge and the vehicle behavior is tending to become unstable or the spin amount SV is tending to converge and the vehicle behavior is tending to become stable. Based on this, it can be predicted whether there is a possibility of an increase in the spin amount SV. If an affirmative determination is made, it is predicted that the spin amount SV is tending to converge and the vehicle behavior is tending to become stable. On the other hand, if a negative determination is made, it is predicted that the spin amount SV is tending to diverge and the vehicle behavior is tending to become unstable.

Figure 13:
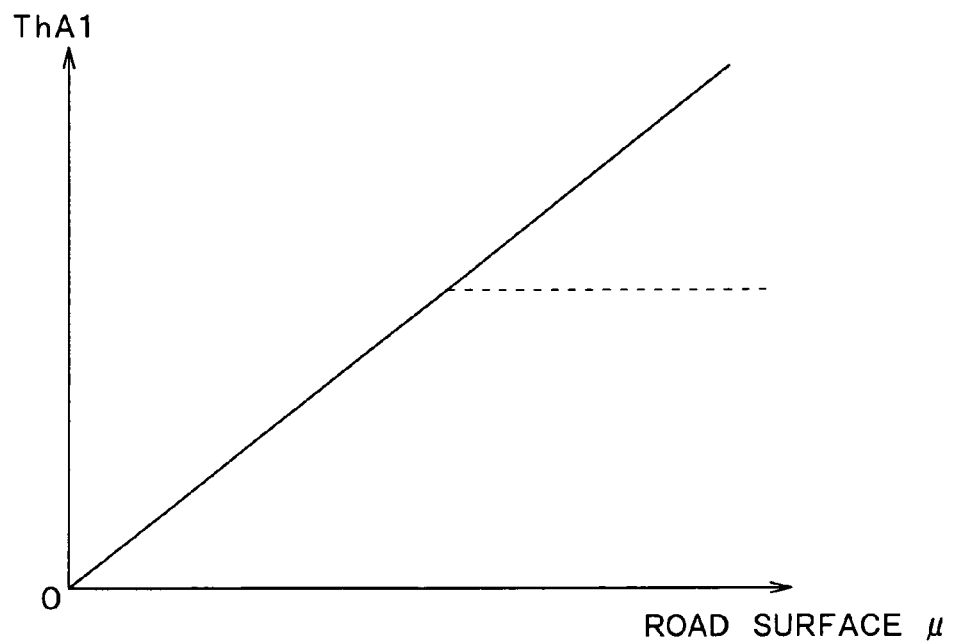
FIG. 13A and FIG. 13B are maps showing the relationship between a road surface μ and a threshold value ThA1 and the relationship between the road surface μ and a threshold value ThA2, respectively.
Figure 13:
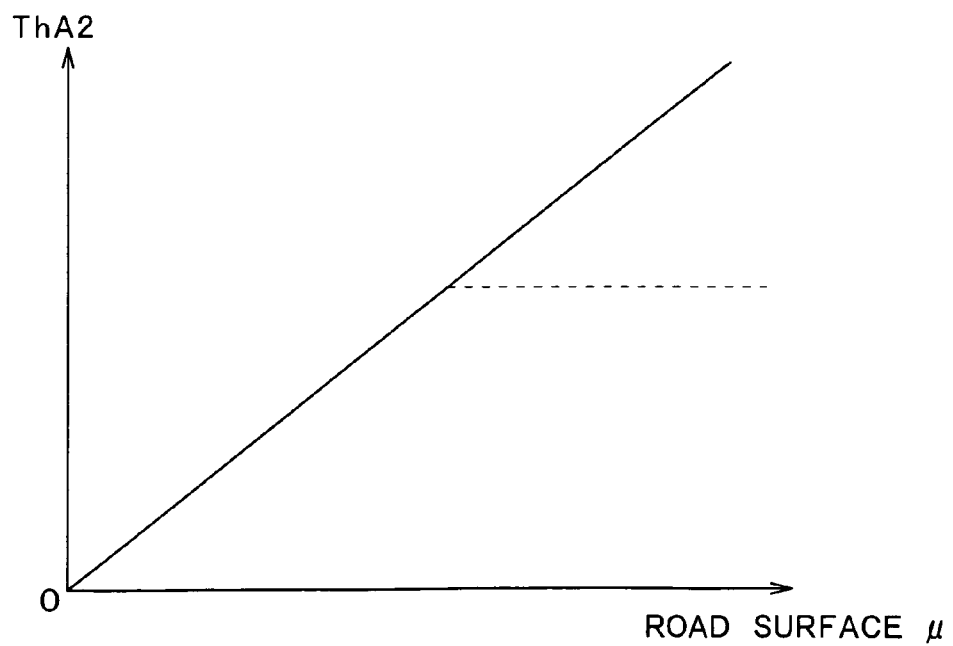

The threshold values ThA1 and ThA2 are values to determine whether the spin amount SV is tending to diverge or tending to converge, and can be set to fixed values. However, the threshold values ThA1 and ThA2 may be varied in accordance with the road surface μ and/or the vehicle speed. For example, as shown in FIGS. 13A and 13B, the threshold values ThA1 and ThA2 may be set such that they become larger as the road surface μ becomes larger. In addition, as shown by dotted line in FIGS. 13A and 13B, an upper limit value may be set for each of the threshold values ThA1 and ThA2. The threshold values ThA1 and ThA2 can be such small values that the behavior of the vehicle can be considered sufficiently stabilized with the values.

In this manner, by comparing the rear wheel slip angle βr with the threshold value ThA2, in addition to comparing the front wheel slip angle βf with the threshold value ThA1, it is possible to obtain the following advantageous effects. As described in the first embodiment, the spin amount can be predicted only by the front wheel slip angle βf. However, with reference to FIG. 10, there is a region where the front wheel slip angle βf becomes zero in a changeover period from the turning in operation to the turning back operation, and in a changeover period from the turning back operation to the stabilization of the vehicle posture. Therefore, in such cases, the performance of the correction to reduce the spin amount SV is inhibited in the present embodiment. Thus, it is possible to more accurately determine whether or not to perform the braking force control in the anti-side slip control based on the magnitude of the spin amount SV.

If an affirmative determination is made at step 340, the routine proceeds to step 350, where the spin amount SV is corrected to a smaller value. More specifically, as shown by FIG. 12, the corrected spin amount SV is obtained by multiplying the spin amount SV by a correction coefficient α(0≦α<1). When the corrected spin amount SV is obtained, or a negative determination is made at step 340, the routine proceeds to step 360. At step 360, the braking force control based on the spin amount SV is performed by a similar method to that used in the first embodiment.

As described above, not only the front wheel slip angle βf, but also the rear wheel slip angle βr is used to determine whether the spin amount SV is tending to diverge and the vehicle behavior is tending to become unstable, or whether the spin amount SV is tending to converge and the vehicle behavior is tending to become stable. As a result, more accurate determination can be made.

(Third Embodiment)

A second embodiment of the present invention will now be described. In the third embodiment, a condition is added for the prediction method of the anti-side slip control in the spin amount prediction portion 70g in the second embodiment, but other features are the same as the first embodiment. Accordingly, only the different points will be described.

Figure 14:
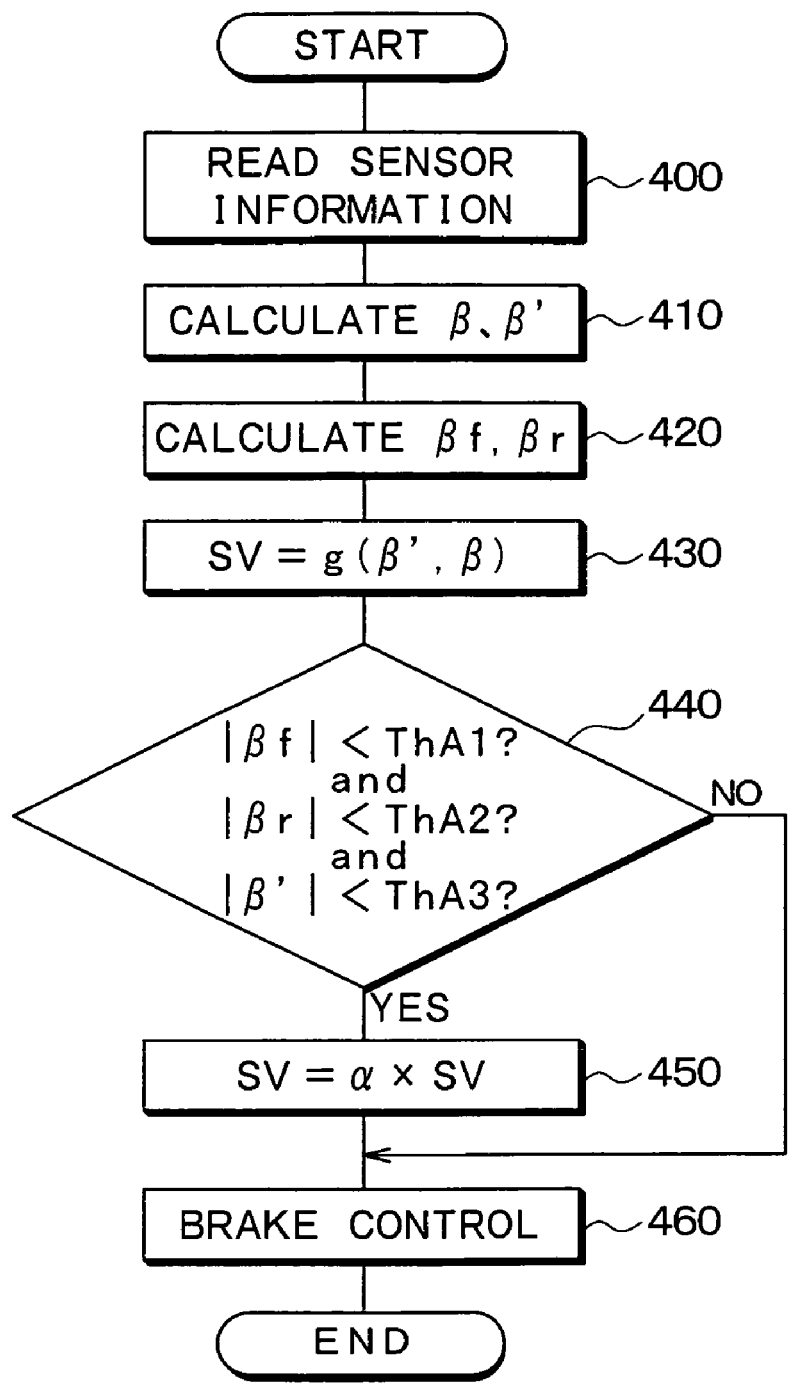
FIG. 14 is a flow chart of an anti-side slip control process according to a third embodiment of the present invention.

FIG. 14 is a flow chart of an anti-side slip control process, which is performed by the brake ECU 70.

FIG. 14 is a flow chart of an anti-side slip control process, which is performed by the brake ECU 70.

First at steps 400 to 430, processes are performed which are equivalent to steps 300 to 330 in the second embodiment.

Next at step 340, it is determined whether all of following three conditions are satisfied or not. The first one of the conditions is that the absolute value |βf| of the front wheel slip angle βf is smaller than the threshold value ThA1. The second one of the conditions is that the absolute value |βr| of the rear wheel slip angle βr is smaller than the threshold value ThA2. The third one of the conditions is that the absolute value |β'| of the slip angle velocity β' serving as a time derivative of the cornering force corresponding amount of the vehicle body is smaller than a threshold value ThA3. Based on the determination, it is determined whether the spin amount SV is tending to diverge and the vehicle behavior is tending to become unstable or the spin amount SV is tending to converge and the vehicle behavior is tending to become stable. Based on this, it can be predicted whether there is a possibility of an increase in the spin amount SV. If an affirmative determination is made, it is predicted that the spin amount SV is tending to converge and the vehicle behavior is tending to become stable. On the other hand, if a negative determination is made, it is predicted that the spin amount SV is tending to diverge and the vehicle behavior is tending to become unstable.

As are the threshold value ThA1 and ThA2, the threshold values ThA3 is a value to determine whether the spin amount SV is tending to diverge or tending to converge, and can be set to fixed values. However, the threshold value ThA3 may be varied in accordance with the road surface β and/or the vehicle speed. For example, as are the threshold value ThA1 and ThA2, the threshold value ThA3 may be set such that they become larger as the road surface β becomes larger. In addition, an upper limit value may be set for the threshold value ThA3.

Figure 15:
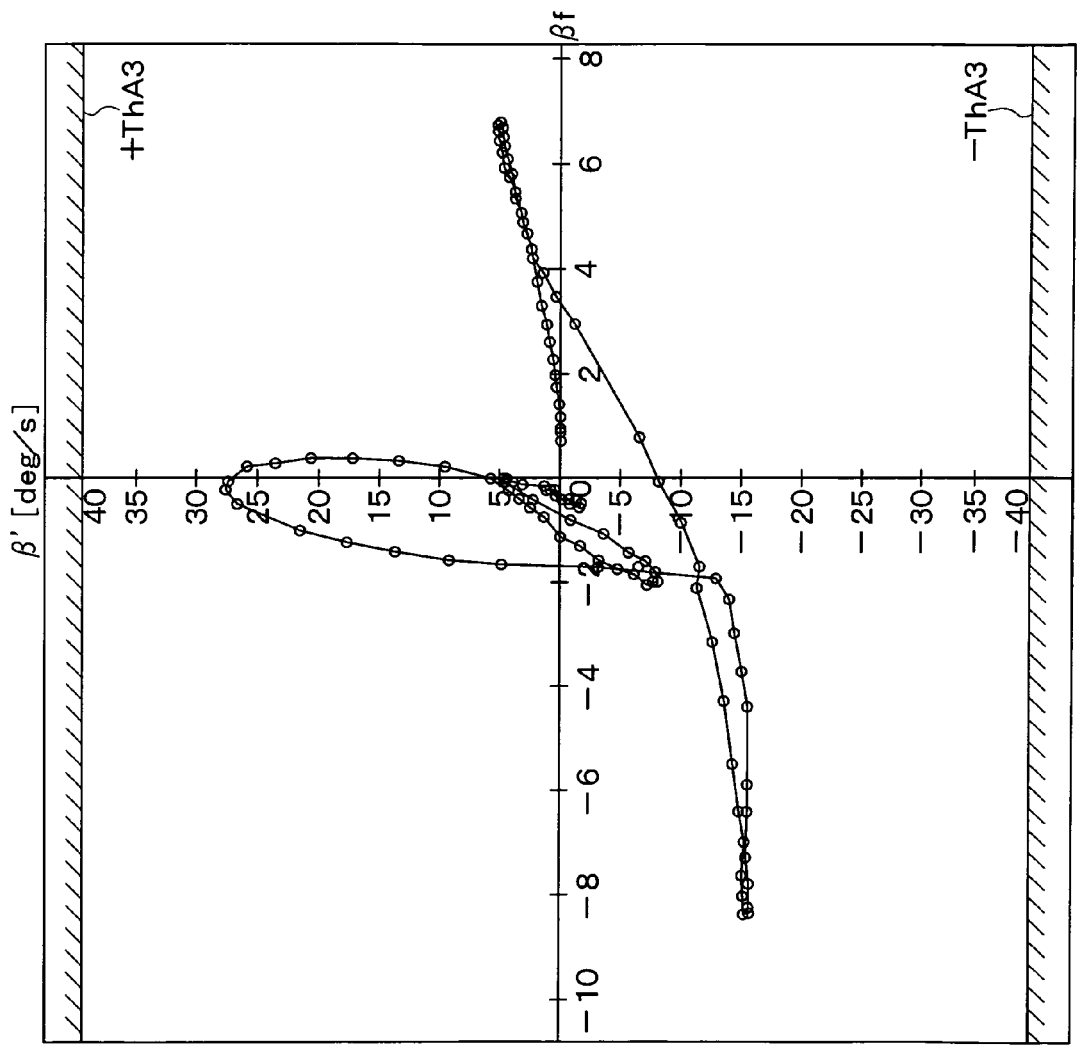
FIG. 15 is a view showing a trajectory of a βf-β' state in two dimensions.
Figure 16:
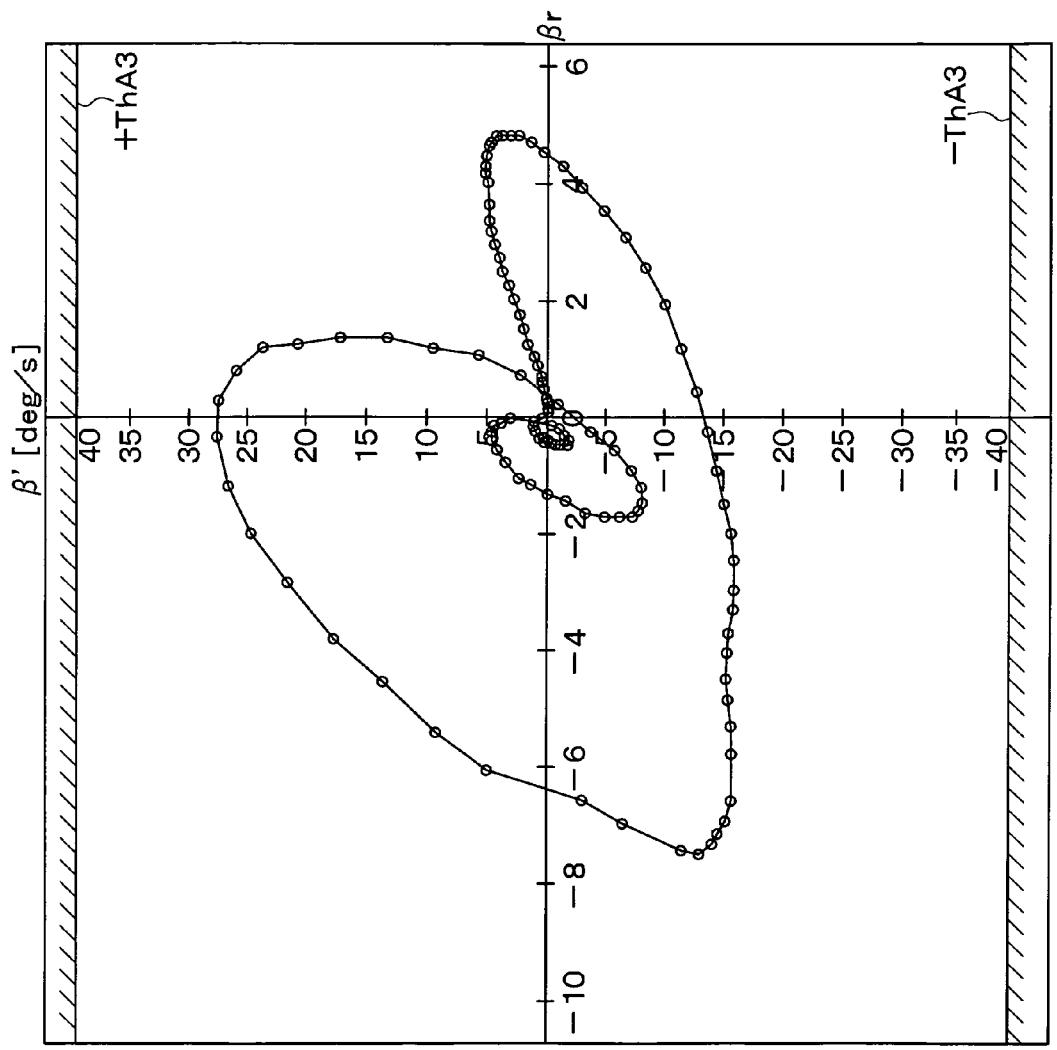
FIG. 16 is a view showing a trajectory of a βr-β' state in two dimensions.
Figure 17:
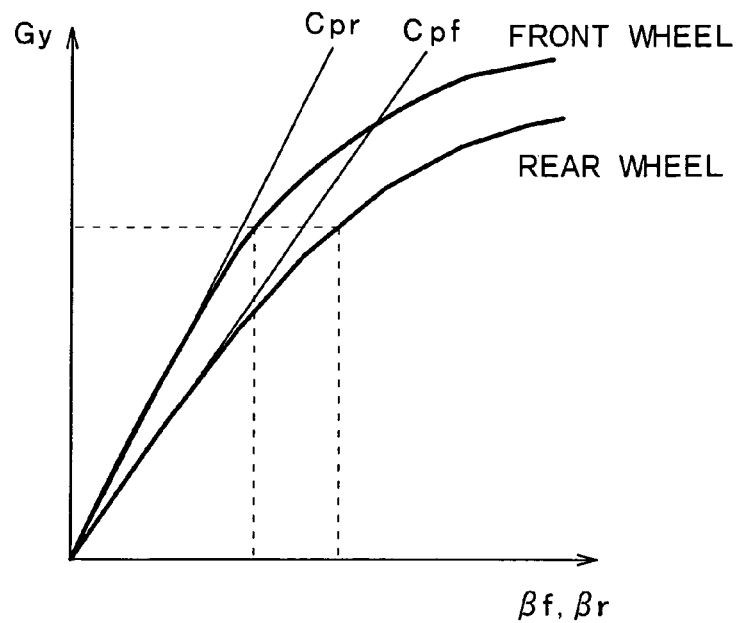
FIG. 17 is a diagram showing the relationship between front and rear wheel slip angles βf, βr and a lateral G Gy (=cornering force/load)
Figure 18:
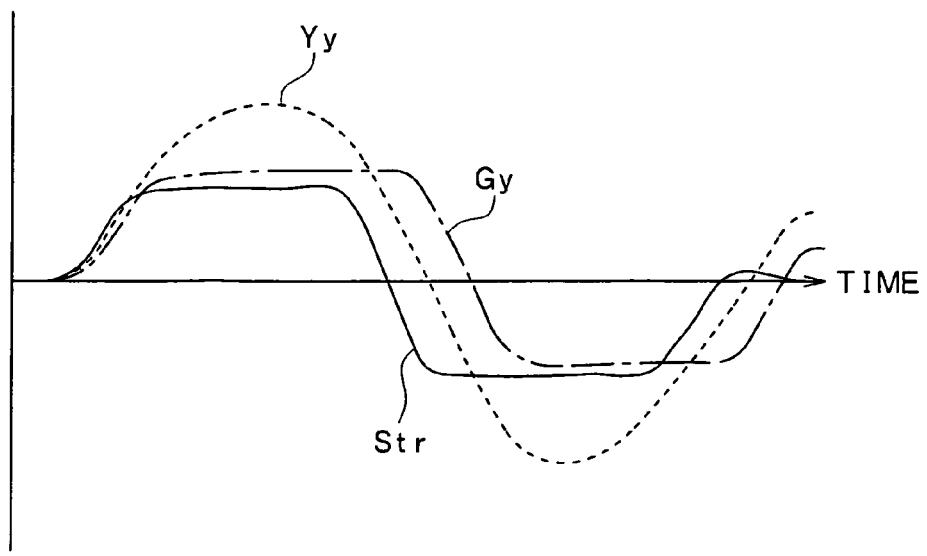
FIG. 18 is a timing chart showing changes in a steer angle, a yaw rate, and a lateral G when a turning operation and a turning back operation are performed.

FIGS. 15 and 16 respectively show the trajectory of the βf-β' state in two dimensions and the trajectory of the βr-β' state in two dimensions in the same condition as shown in FIGS. 9 to 11. The βf-β' state in two dimensions shown in FIG. 15 corresponds to the plane when viewed from the axial direction of the rear wheel slip angle βr in FIG. 11. The βr-β' state in two dimensions shown in FIG. 16 corresponds to the plane when viewed from the axial direction of the front wheel slip angle βf in FIG. 11. In threshold value ThA3 shown as boundary lines in FIGS. 16 and 17 is set to 40 deg/s (approximately 0.7 rad/s). In this case, the threshold value ThA3 is determined so that an acceleration corresponding to a vehicle body velocity of 27 m/s becomes 2G (approximately equals to 0.7×27). The threshold value ThA3 can be a very large value which cannot be achieved when traveling on a normal road surface μ (up to about 1G).

As shown in FIGS. 15 and 16, the absolute value |β'| of the slip angle velocity β' is also smaller than the threshold value ThA3 when the vehicle posture is being stabilized. Therefore, by comparing the slip angle velocity β' with the threshold value ThA3, in addition to comparing the front and rear wheel slip angles βf and βr respectively with the threshold values ThA1 and ThA2, it is possible to obtain the following advantageous effects. As shown in FIG. 11, there is a region where the front wheel slip angle βf becomes smaller than the threshold value ThA1 as well as the rear wheel slip angle βr becomes smaller than the threshold value ThA2 in a changeover period from the turning in operation to the turning back operation, and in a changeover period from the turning back operation to the stabilization of the vehicle posture. Therefore, in such cases, the performance of the correction to reduce the spin amount SV can be inhibited in the present embodiment by using the above-mentioned condition on the slip angle velocity β' as another supplemental condition for predicting the spin amount SV. Thus, it is possible to more accurately determine whether or not to perform the braking force control in the anti-side slip control based on the magnitude of the spin amount SV.

If an affirmative determination is made at step 440, the routine proceeds to step 450, where the spin amount SV is corrected to a smaller value. More specifically, as shown the equation 12, the corrected spin amount SV is obtained by multiplying the spin amount SV by a correction coefficient α(0≦α<1). When the corrected spin amount SV is obtained, or a negative determination is made at step 440, the routine proceeds to step 460. At step 460, the braking force control based on the spin amount SV is performed by a similar method to that used in the first embodiment.

As described above, not only the front and rear wheel slip angles βf and βr, but also the slip angle velocity β' is used to determine whether the spin amount SV is tending to diverge and the vehicle behavior is tending to become unstable, or whether the spin amount SV is tending to converge and the vehicle behavior is tending to become stable. As a result, more accurate determination can be made.

(Other Embodiments)

(1) In the above-described second embodiment, it is determined whether or not the absolute value |βf| of the front wheel slip angle βf is smaller than the threshold value ThA 1, and whether or not the absolute value |βr| of the rear wheel slip angle βr is smaller than the threshold value ThA2. Based on this, it is determined whether the spin amount SV is tending to diverge and the vehicle behavior is tending to become unstable, or the spin amount SV is tending to converge and the vehicle behavior is tending to become stable. Instead, this determination may be made based on whether or not the trajectory passes inside of a region that is defined by a circle equation expressed as a function f(βf, βr) defined as shown by Equation 13. Alternatively, this determination may be made based on whether or not the trajectory passes inside of a region that is defined by an elliptic equation as shown by Equation 14. Note that ThB in Equation 13 is a threshold value, and a, b in Equation 14 are constants.

$$f(\beta f, \beta r) = [\beta f^2 + \beta r^2]^{1/2} < ThB \quad \text{(Equation 13)}$$

$$f(\beta f, \beta r) = \beta f^2/b^2 + \beta r^2/a^2 < 1 \quad \text{(Equation 14)}$$

(2) As described in the second embodiment, there is a region where the front wheel slip angle βf becomes zero during a changeover period from the turning in operation to the turning back operation, and during a changeover period from the turning back operation to the stabilization of the vehicle posture. In order to inhibit the spin amount SV from being corrected in such changeover periods, it is also possible to use a configuration in which the determination in the first embodiment as to whether or not the absolute value |βf| of the front wheel slip angle βf is smaller than the threshold value ThA1 is performed over a certain period of time (during a certain number of calculation cycles). In this configuration, the spin amount SV is only corrected when this state continues for the certain period of time.

In a similar manner, the cornering force corresponding amount calculation portion 70f may calculate a change amount per unit time of the cornering force corresponding amount. If, in addition to the magnitude of the cornering force corresponding amount, the change amount per unit time is larger than a threshold value, for example, it can be determined that the front wheel slip angle βf is soon going to change significantly even if it has become equal to zero. In other words, it can be determined that the spin amount SV is tending to diverge. In this manner, the spin amount SV may be corrected based on the change amount per unit time, as well as based on the magnitude of the cornering force corresponding amount.

(3) In the above-described embodiments, the front wheel slip angle βf and the rear wheel slip angle βr are described as examples of the cornering force corresponding amount. However, other physical quantities may be used. FIG. 17 is a diagram showing the relationship between the front and rear wheel slip angles βf, βr and the lateral G Gy (=cornering force/load). As shown in FIG. 17, the front and rear wheel slip angles βf, βr have a certain relationship with the lateral G Gy. Accordingly, as a physical quantity corresponding to the cornering force of the front wheel, the lateral G of the front wheel may be used instead of the front slip angle βf, and as a physical quantity corresponding to the cornering force of the rear wheel, the lateral G of the rear wheel may be used instead of the rear wheel slip angle βr. Note that the increases of the lateral G Gy with respect to the front and rear wheel slip angles βf, βr shown in FIG. 17 correspond to the cornering power Cpf, Cpr, respectively.

(4) In the above-described embodiments, when the spin amount SV is tending to converge, the spin amount SV is corrected to a smaller value, and the braking force control for the side slip prevention is thereby made difficult to be performed. Contrarily, a configuration may be adopted in which the spin amount SV is set to a small value from the beginning, and if it is predicted that the spin amount SV is tending to diverge, the spin amount SV is corrected to a larger value, thereby making it easy to perform the braking force control for the side slip prevention.

Further, when the convergent tendency is predicted, instead of the method for correcting the spin amount SV in which the anti-spin control is inhibited, inhibition means that inhibits the anti-spin control from the beginning may be provided. In this case, for example, the spin amount correction portion 70h may function as the inhibition means.

(5) In the above-described embodiments, as shown by Equation 12, the correction is performed such that the entire spin amount SV is multiplied by the correction coefficient α. However, the above effect can be obtained by correcting at least a component of the spin angle velocity β' in the spin amount SV. For example, the coefficient K1 of the slip angle velocity β' in Equation 11 may be set to a smaller value.

(6) In addition, in the above-described embodiments, the spin amount SV is controlled as the function g(β', β). However, the spin amount SV may be controlled as a function g(β', β).

(7) In the third embodiment, it is predicted that the spin amount SV is tending to converge and the vehicle behavior is going to be tending to become stable when all of the following three conditions that the absolute value |βf| of the front wheel slip angle βf is smaller than the threshold value ThA1, that the absolute value |βrβ of the rear wheel slip angle βr is smaller than the threshold value ThA2, and that the absolute value |β'| of the slip angle velocity β' is smaller than a threshold value ThA3. The third one of the conditions that the absolute value |β'| of the slip angle velocity β' is smaller than a threshold value ThA3 can be replaced with another condition that both of the absolute value |βf'| of a front wheel slip angle velocity βf' and the absolute value |βr'| of a rear wheel slip angle velocity βr' are smaller than the threshold value ThA3. The front wheel slip angle velocity βf' is the time derivative of the front wheel slip angle βf and serves as the time derivative of the cornering force corresponding amount of the front wheel. The rear wheel slip angle velocity βr' is the time derivative of the rear wheel slip angle βr and serves as the time derivative of the cornering force corresponding amount of the rear wheel.

What is claimed is:

1. A vehicle behavior control device, comprising:
   a first means for calculating a spin amount serving as an index of spin behavior of a vehicle;
   a control means for performing a braking force control of each wheel of the vehicle to prevent side slip in accordance with the spin amount;
   a second means for calculating a slip angle of a front wheel of the vehicle, the slip angle being a discrepancy between a rolling direction of the front wheel and a traveling direction of the vehicle;
   a determination means for determining whether the slip angle of the front wheel is outside of the determined range, by determining whether an absolute value of the slip angle of the front wheel calculated by the second means for calculating is equal to or larger than a threshold value, the determination means determining that the vehicle is not spinning when the absolute value of the slip angle of the front wheel is smaller than a threshold value; and
   a correction means for correcting the spin amount based on a result of determination of the determination means.

2. The vehicle behavior control device according to claim 1, wherein the correction means performs a correction to reduce the spin amount when the determination means determines that the vehicle is not spinning.

3. The vehicle behavior control device according to claim 2, wherein
   the first calculation means calculates the spin amount including at least a slip angle velocity, and
   the correction means corrects at least a component of the slip angle velocity in the spin amount.

4. The vehicle behavior control device according to claim 1, wherein
   the second means for calculating also calculates a rear wheel slip angle of the vehicle, and
   the determination means determines whether the front wheel slip angle and the rear wheel slip angle are within or outside of a determined range by comparing the front wheel slip angle and the rear wheel slip angle respectively with first and second threshold values.

5. The vehicle behavior control device according to claim 4, wherein the determination means determines that the vehicle is not spinning when an absolute value of the front wheel slip angle is smaller than the first threshold value and an absolute value of the rear wheel slip angle is smaller than the second threshold value.

6. The vehicle behavior control device according to claim 4, wherein the determination means determines that the vehicle is not spinning when a square root of a sum of a square of the front wheel slip angle calculated by the second means for calculating and a square of the rear wheel slip angle is smaller than a threshold value.

7. The vehicle behavior control device according to claim 4, wherein the determination means determines that the vehicle is not spinning when a coordinate of the front wheel slip angle and of the rear wheel slip angle that are calculated by the second means for calculating is within a predetermined range of the front wheel slip angle and of the rear wheel slip angle.

8. The vehicle behavior control device according to claim 1, wherein
   the second means for calculating also calculates a change amount per unit time of the slip angle of the front wheel, and the determination means determines whether the vehicle is spinning based on the change amount per unit time, as well as based on a magnitude of the slip angle of the front wheel.

9. The vehicle behavior control device according to claim 1, wherein
the second means for calculating also calculates a rear wheel slip angle of the vehicle and a time derivative of a body slip angle of the vehicle, and
the determination means determines whether the front wheel slip angle and the rear wheel slip angle are within or outside of a determined range by comparing the front wheel slip angle and the rear wheel slip angle respectively with first and second threshold values, and also by comparing the time derivative of the body slip angle with a third threshold value.

10. The vehicle behavior control device according to claim 9, wherein the determination means determines that the vehicle is not spinning when all of first, second, and third conditions are satisfied, wherein the first condition is that the front wheel slip angle is smaller than the first threshold value, the second condition is that the rear wheel slip angle is smaller than the second threshold value, and the third condition is that the time derivative of the body slip angle is smaller than the third threshold value.

11. A vehicle behavior control device, comprising:
a first means for calculating a spin amount serving as an index of spin behavior of a vehicle;
a control means for performing a braking force control of each wheel of the vehicle to prevent side slip in accordance with the spin amount;
a second means for calculating a slip angle of a front wheel of the vehicle, the slip angle being a discrepancy between a rolling direction of the front wheel and a traveling direction of the vehicle;
a determination means for determining whether the slip angle of the front wheel is outside of the determined range, by determining whether an absolute value of the slip angle of the front wheel calculated by the second means for calculating is equal to or larger than a threshold value, the determination means determining that the vehicle is not spinning when the absolute value of the slip angle of the front wheel is smaller than a threshold value; and
an inhibition means for inhibiting the braking force control for the side slip prevention when the determination means determines that the vehicle is not spinning.

12. The vehicle behavior control device according to claim 11, wherein
the second means for calculating also calculates a rear wheel slip angle of the vehicle, and
the determination means determines whether the front wheel slip angle and the rear wheel slip angle are within or outside of a determined range by comparing the front wheel slip angle and the rear wheel slip angle respectively with first and second threshold values.

13. The vehicle behavior control device according to claim 12, wherein the determination means determines that the vehicle is not spinning when an absolute value of the front wheel slip angle is smaller than the first threshold value and an absolute value of the rear wheel slip angle is smaller than the second threshold value.

14. The vehicle behavior control device according to claim 12, wherein the determination means determines that the vehicle is not spinning when a square root of a sum of a square of the front wheel slip angle calculated by the second means for calculating and a square of the rear wheel slip angle is smaller than a threshold value.

15. The vehicle behavior control device according to claim 12, wherein the determination means determines that the vehicle is not spinning when a coordinate of the front wheel slip angle and of the rear wheel slip angle that are calculated by the second means for calculating is within a predetermined range of the front wheel slip angle and of the rear wheel slip angle.

16. The vehicle behavior control device according to claim 11, wherein
the second means for calculating also calculates a change amount per unit time of the slip angle of the front wheel, and
the determination means determines whether the vehicle is spinning based on the change amount per unit time, as well as based on a magnitude of the slip angle of the front wheel.

17. A vehicle behavior control method, comprising:
calculating a spin amount serving as an index of spin behavior of a vehicle;
performing a braking force control of each wheel of the vehicle to prevent side slip in accordance with the spin amount;
calculating a slip angle of a front wheel;
determining whether the vehicle is spinning based on the slip angle of the front wheel;
correcting the spin amount based on the determination result; and
performing the braking force control of each wheel of the vehicle for the side slip prevention based on the corrected spin amount.

18. A vehicle behavior control method, comprising:
calculating a spin amount serving as an index of spin behavior of a vehicle;
performing a braking force control of each wheel of the vehicle to prevent side slip in accordance with the spin amount;
calculating a slip angle of a front wheel;
determining whether the vehicle is spinning based on the slip angle of the front wheel; and
inhibiting the braking force control for the side slip prevention when determination is made that the vehicle is not spinning.

* * * * *